United States Patent [19]
Kemp
[11] 4,035,621
[45] July 12, 1977

[54] EXCAVATOR DATA LOGGING SYSTEM

[75] Inventor: Kenneth A. Kemp, Schenectady, N.Y.
[73] Assignee: General Electric Company, Schenectady, N.Y.

[21] Appl. No.: 595,924
[22] Filed: July 14, 1975

Related U.S. Application Data

[63] Continuation of Ser. No. 421,148, Dec. 3, 1973, abandoned.

[51] Int. Cl.[2] .......... G06F 15/20
[52] U.S. Cl. .......... 235/151.3; 37/116; 235/150.2; 364/300
[58] Field of Search .......... 235/151.3, 151.11, 151, 235/150.2; 444/1; 37/116, DIG. 1

[56] References Cited

U.S. PATENT DOCUMENTS

| | | | |
|---|---|---|---|
| 3,400,374 | 9/1968 | Schumann | 340/172.5 |
| 3,459,925 | 8/1969 | Goosey et al. | 235/151.3 |
| 3,460,278 | 8/1969 | Pesavento et al. | 37/116 |
| 3,636,325 | 1/1972 | Chytil | 37/116 X |
| 3,934,126 | 1/1976 | Zalesov et al. | 235/150.2 |

*Primary Examiner*—Edward J. Wise
*Attorney, Agent, or Firm*—Vale P. Myles

[57] ABSTRACT

A system for measuring, storing, and analyzing excavator parameters in order to classify excavator activity. A rotary position sensor is coupled to the drag drum, the hoist drum, and the center pindle of an excavator in order to generate analog signals that are a function of the drag cable length, the hoist cable length, and the swing angle, respectively. Shunts are placed in circuit with the drag motor armature and the hoist motor armature in order to generate signals proportional to the drag motor current and the hoist motor current, respectively. A watts transducer connected to the power input generates a signal that is proportional to the amount of power being consumed by the excavator. A control panel is provided whereby an operator can set in the month, day, and the shift, and codes identifying the excavator, the operator and any delay or special activities. The six excavator signals are converted into digital form and recorded along with time and the control panel data on a magnetic tape. The information recorded on the tape is analyzed by a digital computer which provides a printed report summarizing and analyzing the activities of the excavator.

4 Claims, 14 Drawing Figures

EXCAVATOR DATA LOGGING SYSTEM

This is a continuation of application Ser. No. 421,148, filed Dec. 3, 1973, now abandoned.

BACKGROUND OF INVENTION

The present invention relates to a system for measuring the productivity of an excavator used in open pit coal mining and, more particularly, to a system that measures and stores various excavator parameters, then analyzes the stored data in order to determine the walking, digging, delay or special activity time spent by the excavator. The data is further analyzed and summarized to provide production reports on a shift or daily basis useful in measuring the efficiency of the excavator, and to assist in the planning of the mining operation.

It is estimated that one typical walking dragline excavator, having a bucket capacity of 50 cubic yards, will strip about 3.6 million tons of coal in a year. If the coal sells for $3 per ton, and if the productivity of that excavator can be increased by 5%, the mine operation will realize more than one-half million dollars of additional income during the year. One approach to measuring the productivity of an excavator is to calculate the amount of coal that has been mined based on either estimating or measuring the volume of coal that has been mined. This method of calculating productivity is not accurate enough to measure small changes in productivity.

Another approach for measuring the productivity of an excavator recording the swing action of the boom on a strip chart recorder. When the excavator is mining, a typical digging cycle consists of digging to fill the bucket with coal overburden, lifting the bucket and swinging the boom so that the bucket is over a dump pile, dumping load and then swinging the boom back to begin another digging cycle. If it is assumed that the bucket load is constant during each swing cycle, then the number of swing cycles that occurred during a shift or a day would be indicative of dragline productivity. This approach for measuring productivity is subject to considerable error because it does not take into account how the varying load in each bucket, and because each swing cycle does not necessarily result in a bucket of overburden being removed. For example, the boom may be swinging because the excavator is being used to build a path for itself in the mine.

It is, therefore, a primary object of this invention to provide a system that accurately measures the productivity of an excavator.

It is a further object of this invention to measure and record various parameters of an excavator for later analysis by a computer.

Another object of this invention is to provide reports to a mine supervisor summarizing the activities of an excavator.

And yet another object of this invention is to provide a mine supervisor with a report analyzing the activities of an excavator so that the mining supervisor can plan more efficient use of the excavator.

SUMMARY OF THE INVENTION

A rotary position sensor is coupled to the drag drum, the hoist drum, and the center pindle of an excavator in order to generate analog signals that are a function of the drag cable length, the hoist cable length, and the swing angle, respectively. Shunts are placed in circuit with the drag motor armature and the hoist motor armature in order to generate signals proportional to the drag motor current and the hoist motor current, respectively. A watts transducer connected to the power input generates a signal that is proportional to the amount of power being consumed by the excavator. A control panel is provided whereby an operator can set in the month, day, and the shift, and codes identifying the excavator, the operator and any delay or special activities. The six excavator signals are converted into digital form and recorded along with time and the control panel data on a magnetic tape. The information recorded on the tape is analyzed by a digital computer which provides a printed report summarizing and analyzing the activities of the excavator. The computer calculates parameters indicative of the productivity of the digging such as time spent digging, the number of dig cycles, time spent walking, and time spent on delay or special activities. The computer also provides an analysis of the power consumption including a determination of the total power consumed and the average and peak power requirements. The computer further calculates parameters indicative of the digging efficiency such as the average swing angle, the distribution of the number of swings versus swing angle, an estimate of how full each bucket is, and the number of digging cycles with multiple passes.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
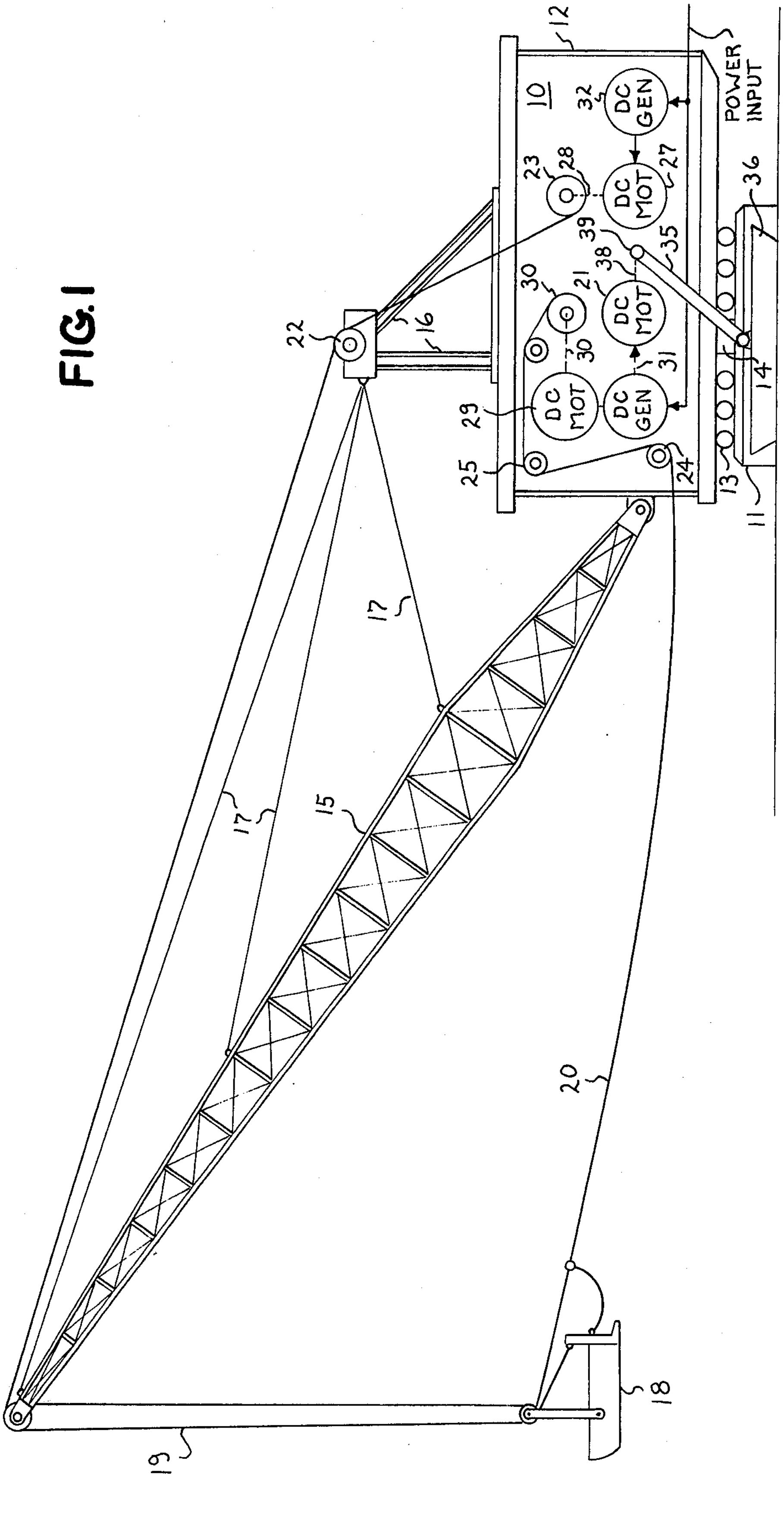
FIG. 1 is a side elevation view of a walking dragline excavator in which the data logging system of this invention may be utilized.

FIG. 1 depicts one type of excavator 10, known as a walking dragline, having a lower frame member 11 and an upper frame member 12. Rollers 13 interposed between the lower frame 11 and the upper frame 12 allow the upper frame 12 to rotate or swing relative to lower frame 11 about center pindle 14. One end of boom 15 is supported by the upper frame 12 of the excavator 10 and the other end of boom 15 is supported by frame members 16 and boom support cables 17. Bucket 18 supported at the end of the boom 15 is controlled by means of hoist cable 19 and drag cable 20. The hoist cable 19 passes over sheave 22 and is wound on hoist drum 23 and the drag cable 20 passes over sheaves 24 and 25 and is wound on drag drum 26. The hoist drum 23 is driven from d-c motor 27 by means of suitable gearing represented by dashed line 28 and the drag drum 26 is driven from d-c motor 29 by means of suitable gearing represented by dashed line 30. D-c motors 27 and 29 are driven from d-c generators 32 and 33, respectively, which are supplied electrical power over cable 34. On each side of the excavator 10 is a walking mechanism consisting of a shoe 36 pivotally mounted on arm 35 forming part of walking mechanism 39. The walking mechanism 39 is driven by the walk motor 21 which receives power as represented by dashed line 31, from drag generator 33.

Figure 2:
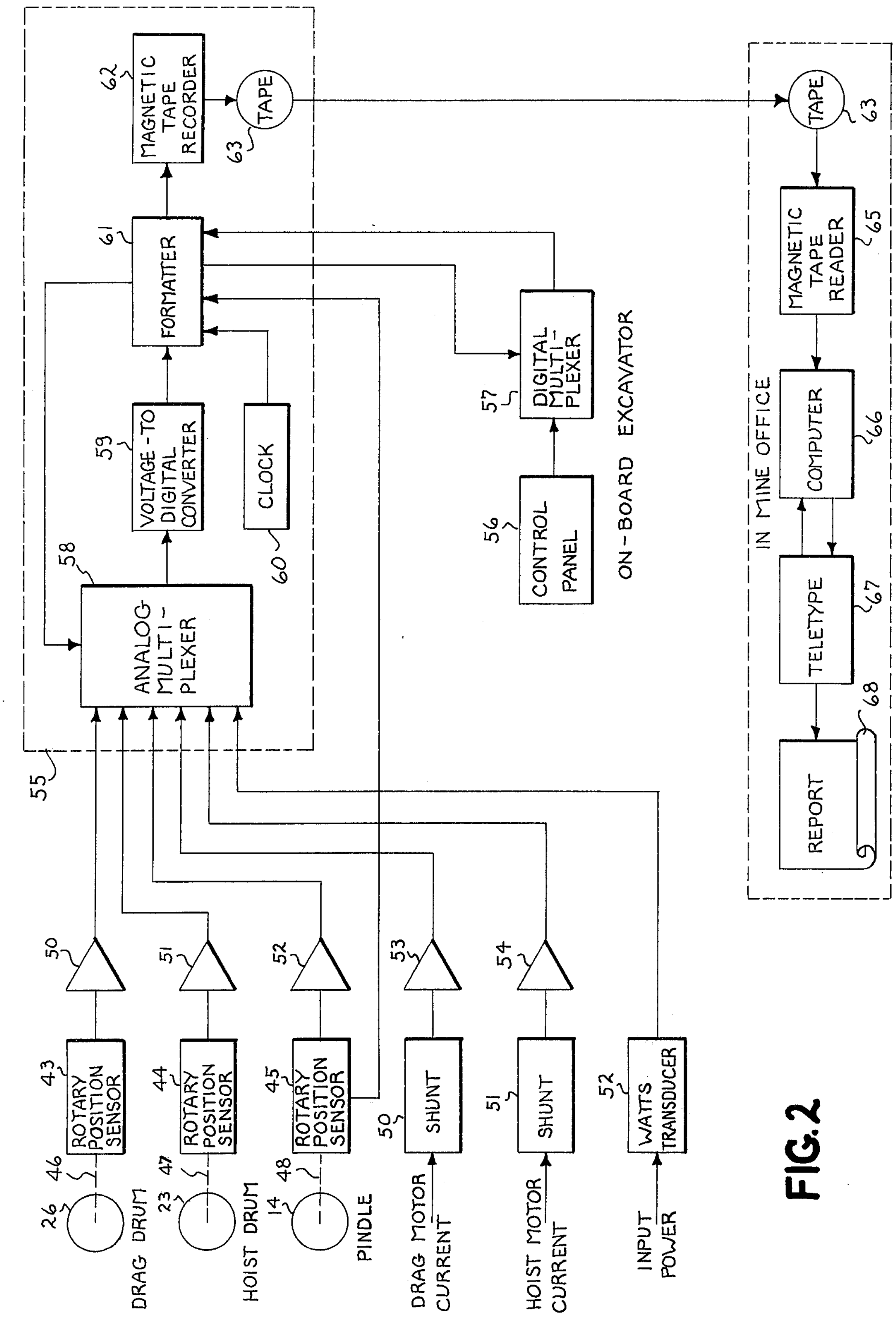
FIG. 2 is a block diagram of the excavator data logging system.

FIG. 2 is a block diagram of a preferred embodiment of the data logging system of this invention. As shown, the data logging system 40 consists of measuring and recording equipment that is on-board the excavator 10 and data processing equipment which can be located in the mine office. The sensor portion of the on-board excavator equipment includes a drag cable sensor 43, a hoist cable sensor 44 and a swing angle sensor 45. In one preferred embodiment the drag cable sensor 43 is rotary position sensor connected to the drag drum 26 by means of suitable gearing as represented by dashed line 46 and the hoist cable sensor 44 is a rotary position sensor connected to hoist drum 23 by means of suitable gearing as represented by dashed line 47. Swing angle sensor 45 consists of a rotary position sensor directly driven from center pindle 14 as indicated by dashed line 48 and a switch, also actuated by rotation of the center pindle 14, that provides a closure that distinguishes angles in the second and third quadrant from angles in the first and fourth quadrant. This quadrant sensing switch is necessitated by the fact that the rotary position sensor output is non-linear, approximating a sinusoid, for one complete revolution. Since the swing angle rotary sensor is directly driven by the center pindle 14, the switch closure is required to remove the quadrant ambiguity from the measurement. The gearing 46, 47 that couples the rotary sensor to the hoist and drag drums 23, 26 is such that the rotary position sensor rotates less than 180° over the full drag or hoist cable travel, thereby providing an unambiguous output. Shunts 50 and 51 are connected in circuit with the armature of drag motor 29 and hoist motor 27, respectively, in order to provide signals that are proportional to the drag motor armature current and the hoist motor armature current. Watts transducer 52 monitors the input power and generates a signal proportional to the amount of electrical power consumed by the excavator 10. One type of rotary position sensor that can be used as the drag cable, hoist cable, or swing angle sensors is Position Control Induction Unit, Model IC2960A127, manufactured by the General Electric Company. One type of shunt that can be used to generate a signal proportional to the drag motor armature current and the hoist motor armature current is a d-c, instrument shunt, type 140, manufactured by the General Electric Company and one type of watts transducer 52 that can be used to generate a signal proportional to the power consumed by the excavator 10 is electrical transducer, type 4701, manufactured by the General Electric Company. Amplifiers 50 through 54 condition the output signal of sensors 43, 44, 45, 50, and 51 so that the signals applied to the data acquisition unit 55 varies between plus and minus 2 ½ volts.

By means of a control panel 56 the operator of the excavator can generate certain information such as codes identifying particular delays, codes identifying special excavator activities, codes identifying the excavator, the month, day, and shift number, the identity of the operator and the oiler.

The data acquisition unit 55 consists of an analog multiplexer 58, a voltage-to-digital converter 59, a clock 60, a formatter 61, and a magnetic tape recorder 62. The six analog voltages generated by signal conditioning amplifiers 50 through 54 and watts transducer 52 are applied to the input of analog multiplexer 58. The analog multiplexer 58, under the control of formatter 61 causes the six analog input voltages to be sequentially presented at the input of the voltage-to-digital converter 59. The output of the voltage-to-digital converter 59 is a digital number, representative of the voltage at its input, that is applied to the input of formatter 61. Clock 60 provides a digital number representation of the time of day to formatter 61. The signals generated by the operator at control panel 56 are applied to the formatter 61 through the digital multiplexer 57. Flow of the control panel information through the digital multiplexer 57 is controlled by the formatter 61. The formatter 61 controls the sequence in which the various data are applied to the magnetic tape recorder 62 which records the data on magnetic tape 63. In one preferred embodiment the data acquisition system 55 is a digital data acquisition system, MARK II, Option 1, and the digital multiplexer 57 is a digital multiplexer, Model DMS-8A, manufactured by Incre-Data Corporation.

The voltage-to-digital converter 59 converts the analog sensor signal into an 11 bit binary number. The drag cable length, hoist cable length swing angle, drag motor current, and hoist motor current are sampled once each second and the watts transducer 52 signal is sampled twice each second.

The data is recorded on standard seven-track magnetic tape in what is known in the art as standard IBM format. At the beginning of a shift a 12 character header recorder is recorded on the tape. All of the header information is obtained from the control panel 56. The delay code is recorded in characters 1 and 2, the special code is recorded in characters 3 and 4, the machine identity number is recorded in character 5, the month is recorded in characters 6 and 7, the day of the year is recorded in the characters 8 and 9, the number of the shift is recorded in character 10, the identity of the operator is recorded in character 11, and the identity of the oiler is recorded in character 12. The header record is followed by a series of data records, each containing 220 characters. Time in hours, minutes, and seconds is recorded in characters 1 through 6; a delay code, as determined from the control panel 56, is recorded in characters 7 and 8; a special code, as determined from control panel 56, is recorded in characters 9 and 10; and 15 seconds of sensor information is then recorded in characters 11 through 220.

With a one second sensor sampling rate, approximately 27 hours of data can be recorded on a 1,000 foot magnetic tape reel, so that one tape will hold the information from three shifts.

After the magnetic tape has been recorded, it is brought to the mine office where it is analyzed by the data processing system. The information extracted from the magnetic tape 63 by magnetic tape reader 65 which provides the information to a digital computer 66. After the digital computer 66 has analyzed the data on the magnetic tape 63, it causes teletype unit 67 to print a report 68 summarizing the activity of the excavator. The computer 66 used in the described embodiment is a GE-PAC 30-2, manufactured by Interdata, Incorporated; the teletype 67 is a teletypewriter station, Model ASR-33, manufactured by Teletype Corporation; and the magnetic tape reader 65 was manufactured by Pertec, 9600 Irondale Avenue, Chadsworth, California.

To process the tape the operator loads the magnetic tape 63 on the magnetic tape reader 65. The computer is loaded with the programs necessary to process the information on the tape by means of either a high-speed tape reader, not shown, or another magnetic tape reader, also not shown. In the described embodiment the operator is able to select a normal report which will include a report for each of three shifts in the day, as well as a daily summary report, or he can select an abnormal report which might be a summary report for just one particular shift. The computer 66 will then begin to search the tape 63 in order to find the first data record consistent with the operators request.

As mentioned previously, the analog signal output of each sensor has been conditioned so that the voltage ranges from minus 2½ to plus 2½ volts. The voltage-to-digital converter 59 converts the conditioned output of the sensor so that the digital number 0 is equivalent to minus 2½ volts and the digital number 2,047 is equivalent to plus 2½ volts. After the sensor data is read from the tape, it is converted into the actual magnitude of the parameter being measured. Since the drag motor current, hoist motor current, and input power signals are linear, this conversion consists of subtracting out half scale which compensates for the fact that zero sensor output translates to the digital number 1,024 out of the voltage-to-digital converter 59 and multiplying the result by a constant in order to get a number that represents directly the measured quantity in amperes or kilowatts. Since the drag cable, hoist cable, and swing angle sensors have a non-linear output, the data from the tape is first corrected for the zero offset and then an interpolation routine is used to convert the resultant number into the appropriate representation of the quantity being measured.

As the data is read from the tape, the computer begins to analyze the data and makes a determination, second-by-second, as to whether the excavator is at that time in a walk cycle, a dig cycle, or a delay or special activity cycle. However, in order to properly classify the excavator activity for a particular second of time, the computer looks at not only the data samples associated with the particular second of time, but also the data samples associated with the 8 seconds following the second in question. In other words, the determination of the activity for any 1 second of time includes an analysis of the data samples occurring in a 9 second aperture that includes the second in question and the 8 seconds following the second in question. Thus, the determination of the activity for a particular time $T_1$ is based on an analysis of data samples recorded from time $t_1$ through $t_9$, and the determination of the activity for the time $T_2$ is based on an analysis of data samples recorded from time $t_2$ through $t_{10}$, and so forth. The data associated with the nine second window is stored in a section of the computer memory referred to as the working buffer, whereas, a record, when it is read from the tape, is stored in the computer memory in a section referred to as the record data buffer. After all the data on the tape has been summarized, a report will be printed summarizing the activity of each shift, and a report summarizing the activity for the day will be printed if requested by the operator. The information printed out in the reports includes information such as the number of hours spent digging, the number of dig cycles, the amount of time available for digging, the amount of non-productive time, the amount of time spent walking, the amount of downtime including a breakdown of the downtime and special activity time, the average time of each dig cycle, the average swing angle associated with each dig cycle, a distribution of the swing angle versus the number of dig cycles, the average swing time, the average drag time and estimated load, the average length of drag cable out at the start of a dig cycle, the vertical hoist distance, the number of cycles with multiple passes, the average drag motor current, the RMS drag motor current, and the RMS hoist motor current. The following information is summarized to give an indication of the power utilized by the excavator including the total energy in kilowatt-hours used during the shift, the average energy in kilo-watt-hours used in a dig cycle, the average power demand over a 15 minute interval, the average peak power per dig cycle, the maximum power demand in a 15 minute interval, and the maximum peak power demanded.

Before proceeding with the detailed description of the computer program that accomplishes the analysis of the data recorded on the magnetic tape, it is pointed out that it is a common practice, in the programming art to break the processing task up into a number of separate functions and then to write a program routine that will accomplish the smaller function. The tieing together of the separate function routines in order to accomplish the overall program task is generally accomplished by another program, sometimes referred to as an executive program. The described embodiment uses 20 function routines or executive programs to process the information on the magnetic tape, and to provide the operator with the summary reports. The detailed description which follows includes the program listing in FORTRAN IV statements of each of the function routines, and executive programs required to generate a report from the data recorded on the magnetic tape. Since the FORTRAN IV program statements use English language text, the program listings alone are sufficient for informing one skilled in the art of programming how the data on the tape is being processed. Each of the function subroutines or executive programs is accompanied by a description and in the case of those routines that are intimately connected with the classification of the excavator activity, the description includes a reference to the flow chart of the program.

Normally, the beginning of each program subroutine contains a listing of the variables used in the different program subroutines. A large part of this listing of the variables remains the same for each program subroutine. In order to avoid repeating this section for each program subroutine listing, the section will be listed once, below, as the Blank Common Program Listing, it being understood that this section precedes each program subroutine listing described below.

ADVWB subroutine will determine whether the tape has been off for a long period of time, or whether there are excessive tape errors, or whether ther is an end of file signal and set the IADVWB flag to identify the type

COMMON VARIABLE DEFINITION

```
1 BCDDAT(12),BINDAT(105)
2, XTBL(22),FXTBLE(22),IND,ILAST,ISTAT
COMMON
1 MACHID,IDAYX(2),MONTHX(2),IYEARX,ISHIFT,NOPER,IBTIMH(2)
2, IBTIMM(2),IETIMH(2),IETIMM(2),STIME,PRODTM,PRODPC,
NDIGGY,DIGGTM
COMMON ISCODE(10),SCTIME(10),IDCODE(10),DCTIME(10),AVCYT,
DIGOIL
COMMON TKWA(9),SWA(9),HRO(9),DRO(9),TKWB(9),HAMP(9),
DAMP(9)
COMMON JSKIP,IDATER
COMMON NCDT,ICLDT,NLDT,IDC,IWC,IW
COMMON ITIMEX,IADVWB,IT,DCODE,SCODE,IDSEG
COMMON NSTPTM,WLKTIM
COMMON IDLDT,IDCDT
COMMON TKWHCA,DMANDC,I15MIN,IPWFL
COMMON SWACYC,NSTIMC,NBLTMC,BFILLP,DROSD,VHDCYC,RDAMPC,
ADAMPC
1, RHAMPC,DCKWH,IREV,IMPASS,PEAKWC,NIDC,IEDIG
COMMON DIGGPC,PRODPA,PRDNOH,WALKTM,NOSTEP,ISTTIM,PRDNON,
DWNTM
1, DWNPC,AVANGL,NOSWG(8),PCSWG(8),IAVSWT,RMSHOS,TOTKWH
COMMON
1 PCSWGT,PCBUCK,IAVBKT,PCBCKT,NOMDRG,AVDRGA,RMSDRA,
AVDRGR,AVHOSR
COMMON AVKWHC,PEAKW,AVPEKW,DBDMAX,AVEDMD,NSTP,ISPEFL
1, BENTIM,REHTIM
COMMON IDAT,ITIMES,ITIMEM,ITIMEH
INTEGER DCODE,SCODE
INTEGER BCDDAT
```

As described previously, two sections in the computer memory are used to store data after it is read from the magnetic tape. The record data section of the memory holds one magnetic tape record, which consists of 15 seconds of sensor data, and the working buffer section of the memory stores the 9 seconds of data that is currently being processed. The ADVWB subroutine determines that all of the data in the record storage section of memory has been transferred to the working buffer section of memory and calls the RDATAS subroutine which reads the next data record on the magnetic tape and stores the data in the record data section of the memory. The RDATAS program subroutine makes use of RDTAPE routine to read information from the tape. This RDTAPE routine is not listed in detail herein as it is part of the basic software system supplied by the computer manufacturer. After the tape data has been stored in the record data section of the memory, the ADVWB subroutine calls for the CONV subroutine which considers the scaling and the non-linearity, if any, of the sensor response in order to translate the sensor data so that each sample is scaled in an appropriate Engineering unit. Some of the information at the beginning of the data record is expressed in binary coded decimal form which is converted into binary form including time in tenths of seconds, the delay code number, and the special code number. The ADVWB subroutine also controls the flow of sensor data through the 9 second working buffer section of memory. For example, if it is the beginning of a shift, 9 seconds of sensor data will be transferred from the record data section of memory to the working buffer section of memory. Thereafter, the most recent eight seconds of sensor data in the working buffer section is advanced one position and the oldest 1 second of sensor data in the record data section of memory is transferred into the working buffer section of memory. If the data record that is read from the tape is not valid, the of error and return to the program which called the ADVWB subroutine. Another program, the SFTANL subroutine, will later anlyze the IADVWB flag and take appropriate action.

ADVWB SUBROUTINE LISTING

```
      DIMENSION IFACT (5)
      DATA IFACT(1),IFACT(2),IFACT(3),IFACT(4),IFACT(5)
      1/3600,360,60,6,1/
      DATA NULL,NTEN,NSVN,NSIX,NONE
      1/0,10,7,6,1/
10    IADVWB = NULL
      IF (IDSEG .EQ. NONE) GO TO 20
      IT = IT + NONE
      IF (IT .GT. 15) GO TO 20
      IADVWB = NONE
      GO TO 32
20    ISTAT = O
      CALL RDATAS
      IF (ISTAT .NE. NULL) GO TO 40
      IADVWB = 2
      IF (MACHID .EQ. NONE .OR. MACHID .EQ. 2) GO TO
      25
      IMIDS = MACHID
      JM = NONE
      MACHID = NONE
25    CALL CONV
      IF (JM .NE. NONE) GO TO 251
      JM = NULL
      MACHID = IMIDS
      IMIDS = NULL
251   ITIMEX = NULL
      DO 26 I = NONE,5
      IMULT = BCDDAT(I)*IFACT(I)
      ITIMEX = ITIMEX + IMULT
26    CONTINUE
      IT = NONE
      IADVWB = 2
27    DCODE = BCDDAT(7)*NTEN + BCDDAT(8)
      SCODE = BCDDAT(9)*NTEN + BCDDAT(10)
      IF (IDSEG .NE. NONE) GO TO 30
      DO 28 I = NONE,9
      J = I*NSVN - NSIX
      TKWA(I) = BINDAT(J)
      SWA(I) = BINDAT(J + 1)
      HRO(I) = BINDAT(J + 2)
      DRO(I) = BINDAT(J + 3)
      TKWB(I) = BINDAT(J + 4)
      HAMP(I) = BINDAT(J + 5)
```

-continued

```
         DAMP(I) = BINDAT(J + 6)
28       CONTINUE
         IT = 9
         GO TO 90
30       IT = NONE
32       J = NULL
         DO 34 I = 2,9,1
         J = J + NONE
         TKWA(J) = TKWA(I)
         SWA(J) = SWA(I)
         HRO(J) = HRO(I)
         DRO(J) = DRO(I)
         TKWB(J) = TKWB(I)
         HAMP(J) = HAMP(I)
         DAMP(J) = DAMP(I)
34       CONTINUE
         K = IT*NSVN - NSIX
         TKWA(9) = BINDAT(K)
         SWA(9) = BINDAT(K + 1)
         HRO(9) = BINDAT(K + 2)
         DRO(9) = BINDAT(K + 3)
         TKWB(9) = BINDAT(K + 4)
         HAMP(9) = BINDAT(K + 5)
         DAMP(9) = BINDAT(K + 6)
         GO TO 90
40       IF (ISTAT .NE. -1) GO TO 42
         IADVWB = 6
         GO TO 99
         IF (ISTAT .NE. -2) GO TO 44
         IADVWB = 5
         GO TO 99
44       IF (ISTAT .NE. NONE) GO TO 46
         IADVWB = 3
         GO TO 99
46       IF (ISTAT .NE. 2) GO TO 20
         IADVWB = 4
         GO TO 99
90       IDSEG = NULL
99       RETURN
         END
```

RDATAS SUBROUTINE LISTING

```
         COMMON ISHFTB(156),SHFTBL(171)
         COMMON SPRS(25)
         COMMON DMOTBL(72),IDMOTB(84)
         NCB = 10
         NFC = 105
         CALL RDTAPE (NBC,BCDDAT,NFC,BINDAT,ISTAT)
99       RETURN
         END
```

As mentioned in the description of FIG. 2, the analog sensor information is converted into an 11 bit binary number by the voltage-to-digital converter 59. The 11 bit number is stored in two characters on the magnetic tape. In the case of the swing angle sensor, a 12th bit, the quadrant sensing signal, is recorded on the magnetic tape. The CONV subroutine examines each of the sensor data number and makes sure that the 12th bit is a 0 for all data except the swing angle data. Since the watts transducer, the drag motor shunt, and the hoist motor shunt have linear outputs, the conversion routine subtracts out half scale, in order to compensate for the zero offset, and then multiplies the result by an appropriate scale factor to get either kilowatts or amperes. The rotary sensors that are used to measure the swing angle, the hoist cable length, and the drag cable length do not have a linear output. In order to convert, for example, a drag sensor sample having the value X, two tables, XTBL and FXTBLE, are used to store, respectively, 22 binary count values and the drag cable length that corresponds to the 22 binary count values. The program then looks for the two numbers in XTBL that are just greater than and just less than the number X. These two numbers are called $X_{i-1}$ and $X_i$, respectively, and from FXTBLE the actual cable length that corresponds to $X_{i-1}$ and $X_i$ is $F_{i-1}$ and $F_i$, respectively. The CONV subroutine then calls the FXINT function routine which performs a linear interpolation to calculate the amount of drag cable that is equivalent to X according to the equation:

$$F_x = F_{i-1} + \frac{(X - X_{i-1})\,(F_i - F_{i-1})}{(X_i - X_{i-1})}$$

The conversion for hoist cable length samples is identical to the conversion for drag cable length. The conversion of swing angle samples is very similar to the conversion for drag and hoist cable length, except that the entire swing angle curve is broken into two sections, the first section including quadrants 2 and 3 and the second section including quadrants 1 and 4. Based on the condition of the quadrant sensing switch, the CONV subroutine refers to a frist XTBL and its corresponding FXTBLE when samples from quadrants 2 and 3 are being converted and refers to a second XTBL and its corresponding FXTBLE when data from quadrants 1 and 4 are being converted.

CONV SUBROUTINE LISTING

```
COMMON ISHFTB(156),SHFTBL(171)
COMMON SPRS(25)
COMMON DMOTBL(72),IDMOTB(84)
DIMENSION
1 XSW1 (22,2),FXSWA(22,2),XHDP(22),HAMPSF(2),DAMPSF(2),
TKWSF(2),
2 FXHDP(22)
DATA HAMPOF,HAMPSF(1),HAMPSF(2)/1024.,4.88,4.88/
DATA DAMPOF, DAMPSF(1),DAMPSF(2)/1024.,4.88,4.88/
DATA TKWOFS,TKWSF(1),TKWSF(2)/1024.,18.25,18.25/
DATA XSW1( 1,1),XSW1( 2,1),XSW1( 3,1),XSW1( 4,1),XSW1( 5,1),
1 XSW1( 6,1)/ 1., 5., 10., 17., 66., 144./
DATA XSW1( 7,1),XSW1( 8,1),XSW1 (9,1),XSW1(10,1),XSW1(11,1),
1 XSW1(12,1)/ 385., 647., 807., 917.,1023.,1024./
DATA XSW1(13,1),XSW1(14,1),XSW1(15,1),XSW1(16,1),XSW1(17,1)
1              /1130.,1240.,1400.,1531.,1662./
DATA XSW1(18,1),XSW1(19,1),XSW1(20,1),XSW1(21,1),XSW1(22,1)
1              /1903.,1981.,2030.,2042.,2047./
DATA XSW1( 1,2),XSW1( 2,2),XSW1( 3,2),XSW1( 4,2),XSW1( 5,2),
1 XSW1( 6,2)/ 1., 13., 29., 54., 199., 221./
DATA XSW1( 7,2),XSW1( 8,2),XSW1(9,2),XSW1(10,2),XSW1(11,2),
1 XSW1(12,2)/ 389., 835., 929., 974.,1007.,1024./
DATA XSW1(13,2),XSW1(14,2),XSW1(15,2),XSW1(16,2),XSW1(17,2)
1              /1032.,1097.,1167.,1322.,1772./
DATA XSW1(18,2),XSW1(19,2),XSW1(20,2),XSW1(21,2),XSW1(22,2)
1              /1903.,1985.,2030.,2042.,2047./
DATA FXSWA( 1,1),FXSWA( 2,1),FXSWA( 3,1),FXSWA( 4,1),
FXSWA( 5,1),
1       FXSWA( 6,1)
```

-continued

```
2            / 283., 285., 287., 290., 300., 310./
DATA FXSWA( 7,1),FXSWA( 8,1),FXSWA( 9,1),FXSWA(10,1),
FXSWA(11,1),
1            FXSWA(12,1)
2            / 320., 330., 340., 350., 360., 0./
DATA FXSWA(13,1),FXSWA(14,1),FXSWA(15,1),FXSWA(16,1),
FXSWA(17,1)
1            / 10., 20., 30., 35., 40./
DATA FXSWA(18,1),FXSWA(19,1),FXSWA(20,1),FXSWA(21,1),
FXSWA(22,1)
1            / 50., 60., 70., 75., 77./
DATA FXSWA( 1,2),FXSWA( 2,2),FXSWA( 3,2),FXSWA( 4,2),
FXSWA( 5,2),
1            FXSWA( 6,2)
2            / 282., 280., 275., 270., 260., 250./
DATA FXSWA( 7,2),FXSWA( 8,2),FXSWA( 9,2),FXSWA(10,2),
FXSWA(11,2),
1            FXSWA(12,2)
2            / 240., 220., 210., 200., 190., 182./
DATA FXSWA(13,2),FXSWA(14,2),FXSWA(15,2),FXSWA(16,2),
FXSWA(17,2)
1            / 180., 160., 150., 140., 120./
DATA FXSWA(18,2),FXSWA(19,2),FXSWA(20,2),FXSWA(21,2),
FXSWA(22,2)
1            / 110., 100., 90., 885., 78./
DATA XHDP(1),XHDP(2),XHDP(3),XHDP(4),XHDP(5),XHDP(6)
2/ 1., 5., 10., 17., 42., 66./
DATA XHDP(7),XHDP(8),XHDP(9),XHDP(10),XHDP(11),XHDP(12)
2/ 144., 385., 647., 807., 917.,1024./
DATA XHDP(13),XHDP(14),XHDP(15),XHDP(16),XHDP(17)
1/1130.,1240.,1400.,1662.,1782./
DATA XHDP(18),XHDP(19),XHDP(20),XHDP(21),XHDP(22)
1/1903.,1981.,2030.,2042.,2047./
DATA FXHDP( 1),FXHDP( 2),FXHDP( 3),FXHDP( 4),FXHDP( 5),
FXHDP( 6)
1/ 0.0, 4.8, 9.9, 16.9, 29.1, 41.1/
DATA FXHDP( 7),FXHDP( 8),FXHDP( 9),FXHDP(10),FXHDP(11),
FXHDP(12)
1/ 65.2, 89.4, 113.6, 137.7,161.9,186.0/
DATA FXHDP(13),FXHDP(14),FXHDP(15),FXHDP(16),FXHDP(17)
1/210.2,234.3,258.5,282.7,294.8/
DATA FXHDP(18),FXHDP(19),FXHDP(20),FXHDP(21),FXHDP(22)
1/306.8,331.0,355.1,367.2,372.0/
DO 300 J = 1,105,7
DO 90 K = 0,6
IF (K .EQ. 1) GO TO 90
L = J + K
IF (BINDAT(L) .GT. 2047.) BINDAT(L) = BINDAT(L) - 2048.
90   CONTINUE
BINDAT(J + 0) = BINDAT(J + 0) - TKWOFS) * TKWSF(MACHID)
LR = 1
IF (BINDAT(J + 1).LT.2048.) GO TO 100
BINDAT(J + 1) = BINDAT(J + 1) - 2048.
LR = 2
100  CONTINUE
IND = 22
DO 110 I = 1,IND
XTBL(I) = XSW1(I,LR)
110  FXTBLE(I) = FXSWA(I,LR)
BINDAT(J + 1) = FXINT(BINDAT(J + 1)
DO 120 I = 1,IND
XTBL(I) = XHDP(I)
120  FXTBLE(I) = FXHDP(I)
BINDAT(J + 2) = FXINT(BINDAT(J + 2))
BINDAT(J + 3) = FXINT(BINDAT(J + 3))
BINDAT(J + 4) = (BINDAT(J + 4) - TKWOFS * TKWSF(MACHID)
BINDAT(J + 5) = (BINDAT(J + 5) - HAMPOF) * HAMPSF(MACHID)
BINDAT(J + 6) = (BINDAT(J + 6) - DAMPOF) * DAMPSF(MACHID)
300  CONTINUE
RETURN
```

FXINT FUNCTION LISTING

```
DIMENSION XTBLE(22)
EQUIVALENCE (XTBL(22,),XTBLE(22))
DO 100 I = 2,IND
IF (X.LT.XTBLE(I)) GO TO 110
100  CONTINUE
I = IND
110  FXINT = FXTBLE(I - 1) + (X - XTBLE(I - 1)) *
1       ((FXTBLE(I) - FXTBLE(I - ))/(XTBLE(I) - XTBLE(I - 1)))
RETURN
END
```

The SCANTM subroutine is used to determine the time that has elapsed between data samples. Data is normally sampled once every second. However, if the sample occurs immediately after an end of record gap, the prior sample will have occured 2.42 seconds earlier.

The PWRCAL subroutine performs the input power calculations used in various subroutines. Power is normally sampled twice every second. A first sample, KWA, is taken at the beginning of a one second interval and a second sample, KWB, is taken 4/7 of a second after the first sample. The program first computes the average input power for every interval as being the average of the two readings that define the interval. A calculation is then made of the average energy in kilowatt-hours used during a one second (or 2.42 second) interval, taking into account the fact that one of the calculations of average power applies to a 4/7 second time interval and the other average power calculation applies to either a 3/7 second or a 1.84 second interval. If calculations are being made for other than a dig cycle, the total energy in kilowatt-hours during the cycle is accumulated. Then the average power, ignoring any negative values of power consumption, is calculated over a 15 minute period. If the power is being calculated for a dig cycle, the total energy expended during the cycle is accumulated, each input power sample, KWA and KWB, is tested to determine if either of the two samples are larger than any prior input power sample during the cycle and a running total is made of the mean square drag motor current and hoist motor current as determined from the following algorithm:

$$I_T^2 = \frac{I_{T-t}^2 (T-t)}{T} + \frac{(i_1^2 + i_1 i_2 + i_2^2)t}{3T}$$

where $I_T^2$ is the average mean square current through time $T$, $I_T{}^2{}_{-t}$ is the average mean square current through time T—$t$, $i_1$ is the current sample at time T—$t$, and $i_2$ is the current sample at time $T$

SCANTM SUBROUTINE LISTING

```
   COMMON ISHFTB(156),SHFTBL(171)
   DATA SECTIM,RECTIM/1.0,2.42/
10 CONTINUE
   IF (IT .EQ. 9) GO TO 20
   FXTBLE(1) = SECTIM
   GO TO 90
20 CONTINUE
   FXTBLE(1) = RECTIM
90 CONTINUE
   RETURN
   END
```

PWRCAL SUBROUTINE LISTING

```
   DATA FRSVNS,THSVNS,ONSIXT,ONFIFT/.57143,.42857.,01666,
   .06666/
   DATA SCNTIM,RIGTIM/0.0,1.42/
   DATA SECHR/3600./
5  IF (IT .EQ. 8) GO TO 7
   XTINT = SCNTIM
   GO TO 10
7  XTINT = RIGTIM
10 CONTINUE
   TKW4 = (TKWA(1) + TKWB(1))/2.0
   TKW3 = (TKWB(1) + TKWA(2))/2.0
   IF (IPWFL .NE. 1) GO TO 15
   IF (NIDC .EQ. 0) GO TO 90
15 CONTINUE
   OSECAG = (FRSVNS * TKW4 + (THSVNS + XTINT) * TKW3)/SECHR
   IF (IPWFL .EQ. 1) GO TO 50
   TKWHCA = TKWHCA + OSECAG
   IF (TKW4 .LT. 0.) GO TO 38
35 DMANDC = DMANDC + TKW4 * FRSVNS * ONSIXT * ONFIFT
   GO TO 38
38 CONTINUE
   IF (TKW3 .LT. 0.) GO TO 90
   DMANDC = DMANDC + TKW3 * (THSVNS + XTINT) * ONSIXT * ONFIFT
   GO TO 90
50 CONTINUE
   DCKWH = DCKWH + OSECAG
   IF (TKWA(1) .LT. PEAKWC) GO TO 55
   PEAKWC = TKWA(1)
55 IF (TKWB(1) .LT. PEAKWC) GO TO 60
   PEAKWC = TKWB(1)
60 CONTINUE
   FNIDC = NIDC
   RNIDC = (FNIDC - (1.0 + XTINT))/FNIDC
   IF (RNIDC .GE. 0.0) GO TO 65
   RNIDC = 0.0
65 CONTINUE
   FTEMP = (1.0 + XTINT)/(3. * FNIDC)
   RDAMPC = (RDAMPC * RNIDC) + (DAMP(1) * DAMP(1) + (DAMP(1) *
   DAMP(2)
   1 + DAMP(2) * DAMP(2)) * FTEMP
   RHAMPC = (RHAMPC * RNIDC) + (HAMP(1) * (HAMP(1) + HAMP(1) *
   HAMP(2)
   1 + HAMP(2) * HAMP(2)) * FTEMP
   GO TO 90
90 IPWFL = 0
   RETURN
   END
```

The WALKCY subroutine analyzes the excavator sensor samples to determine if a walk cycle is about to begin or if an excavator step is about to begin. When the excavator 10 is performing a walking activity, walk motors 21 will relieve power from drag generators 33 and the bucket 18 will not be undergoing significant motion. The test for determining the start on a walk cycle, as performed in the WALKCY subroutine, requires that four test be satisfied. The first test requires each of the first four drag generator current samples in the working buffer to exceed 700 amperes. This provides an indication that the walk motor is expending enough energy to operate the walking mechanism so as to move foot 36 upward. The second test requires the difference between the first and ninth drag cable length samples in the working buffer to be no greater than 10 feet. The third test requires each of the first four hoist motor current samples in the working buffer to be less than 700 amperes. The fourth test requires the difference between the first and ninth hoist cable length samples in the working buffer to be no greater than 10 feet.

The last three tests indicate that the bucket is not undergoing substantial motion. It is to be appreciated that the particular current levels and cable length difference used in the above tests depend on the characteristic of the particular excavator.

Although the WALKCY subroutine, as described, required four tests to be met in order to determine the start of a walk cycle, it is pointed out that it may be necessary to use both the hoist motor test and a hoist cable test. For example, it may be possible to determine that the hoist cable is not causing the bucket to undergo sufficient motion by using only the hoist cable test. Similarly, it may be possible to eliminate the drag cable test if a switch indication is used to sense that the drag generator has been disengaged from the drag motor and is engaged to operate the walking motor. Sensing the position of the switch would then act to confirm the fact that the drag generator is being used to operate the walking mechanism.

Figure 3:
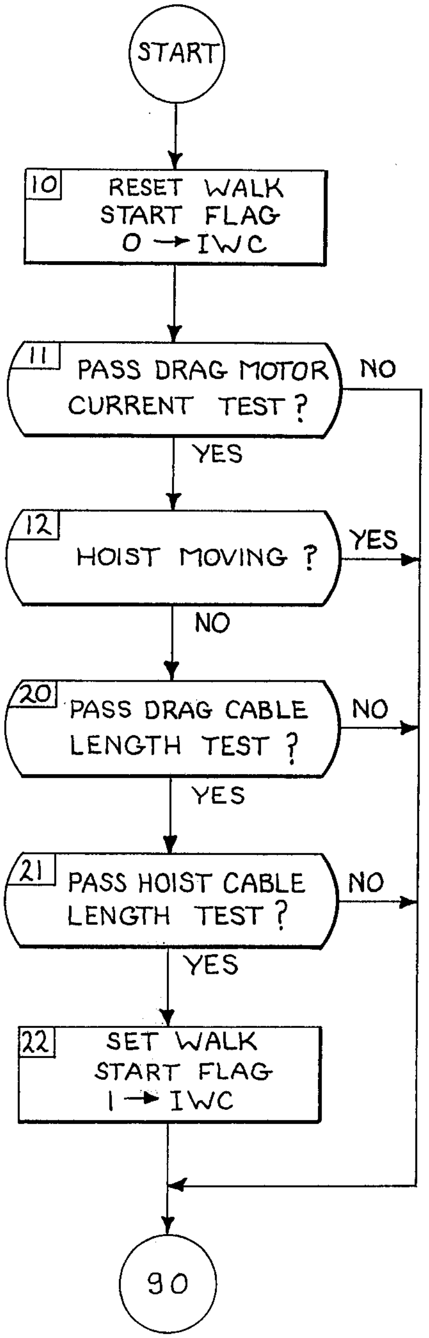
FIG. 3 is a flow diagram of the subroutine that is used to determine the start of a walk cycle.

FIG. 3 is a flow chart of the WALKCY program subroutine. The number in the corner of certain flow chart blocks refers to a program statement number that is used in the subroutine listing.

WALKCY SUBROUTINE LISTING

```
   DIMENSION DAMPSW(2),HAMPSW(2)
   DATA DAMPSW(1),DAMPSW(2),HAMPSW(1),HAMPSW(2)
   1/700.,700.,700.,700./
10 IWC = 0
   J = MACHID
   DO 13 I = 1,4
11 IF (DAMP(I) .LT. DAMPSW(J)) GO TO 90
12 IF (HAMP(I) .GT. HAMPSW(J)) GO TO 90
13 CONTINUE
20 CONTINUE
   IF (ABS(DRO(1) - DRO(9)) .GT. 10.) GO TO 90
21 IF (ABS(HRO(1) - HRO(9)) .GT. 10.) GO TO 90
22 IWC = 1
90 RETURN
   END
```

Normally a walk consists of a number of steps. At the beginning of a step the walk motor 31 operates the walking mechanism 35, 36, 38 and 39 so as to raise the foot 36. After the foot has been driven up past the vertical, it begins to descend which causes the walk motor 31 to act as a generator causing current flow to reverse in the armature of the drag generator 33. Once this regenerative condition is sensed, it is known that the step will be completed and a search is made for either a new step or for the end of the walk cycle.

Figure 5:
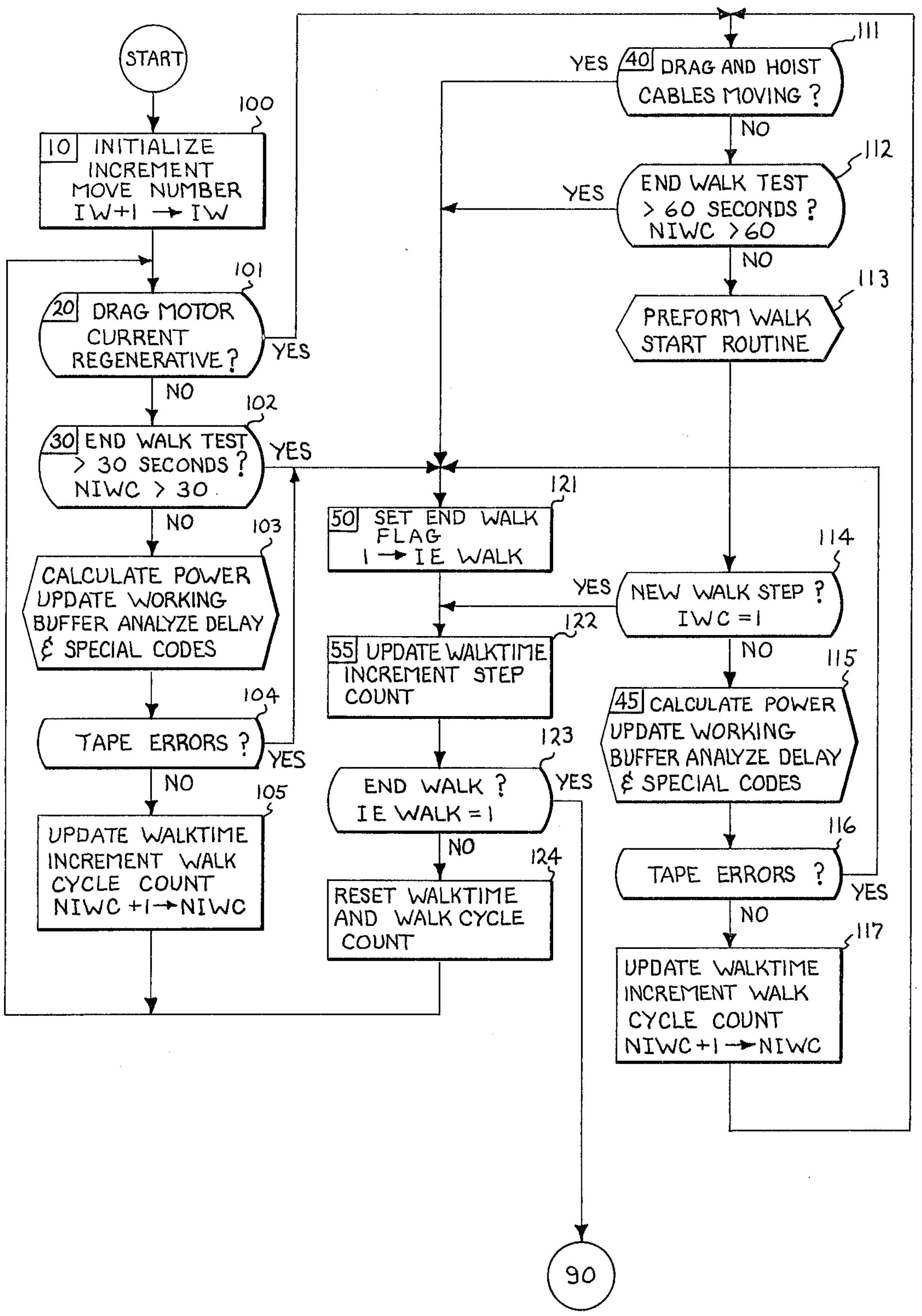
FIG. 5 is a flow diagram of the subroutine that performs the calculations associated with the analysis of a walk cycle.
Figure 6A:
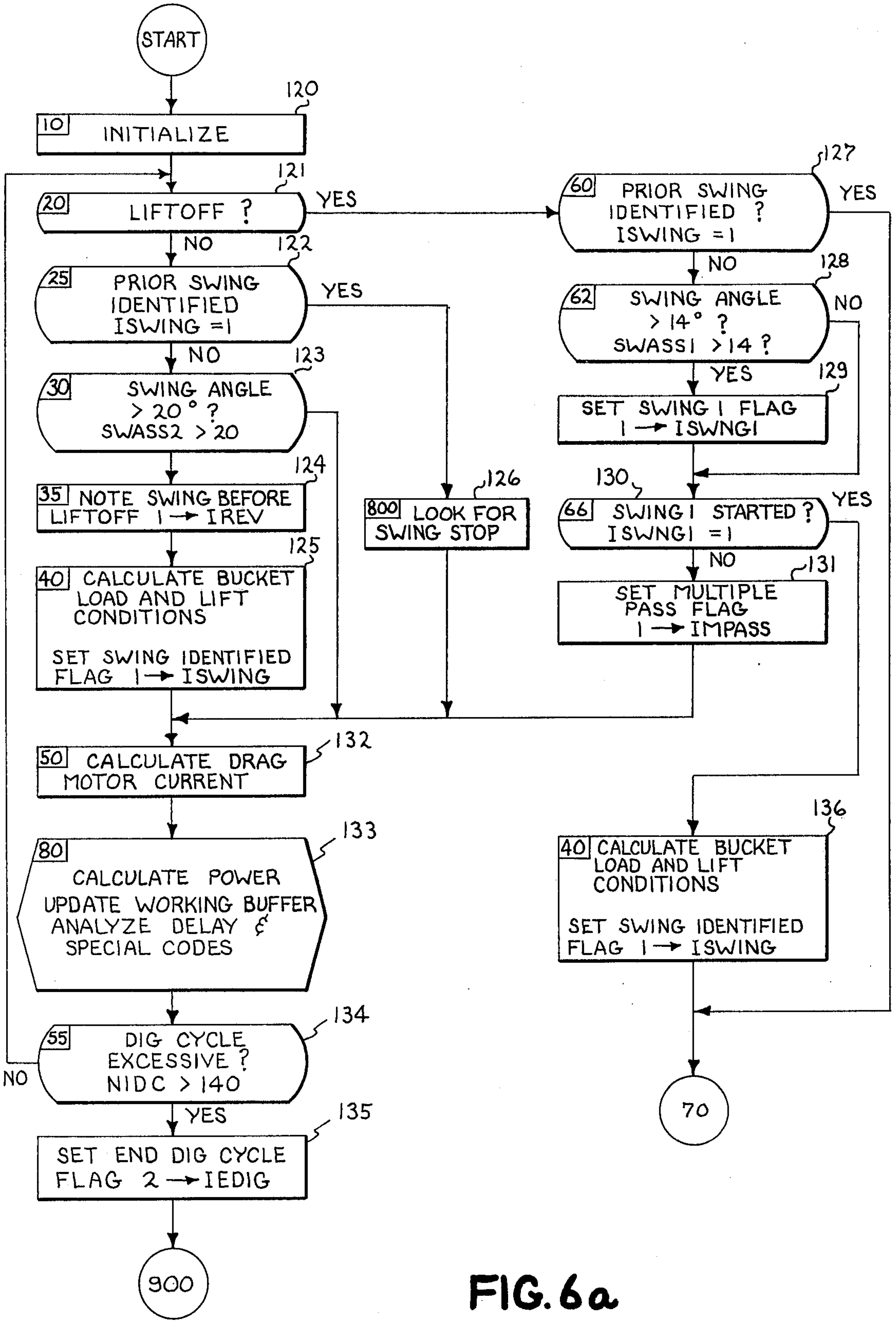
FIG. 6 is a flow diagram of the subroutine that performs the computations associated with the analysis of a dig cycle.
Figure 6B:
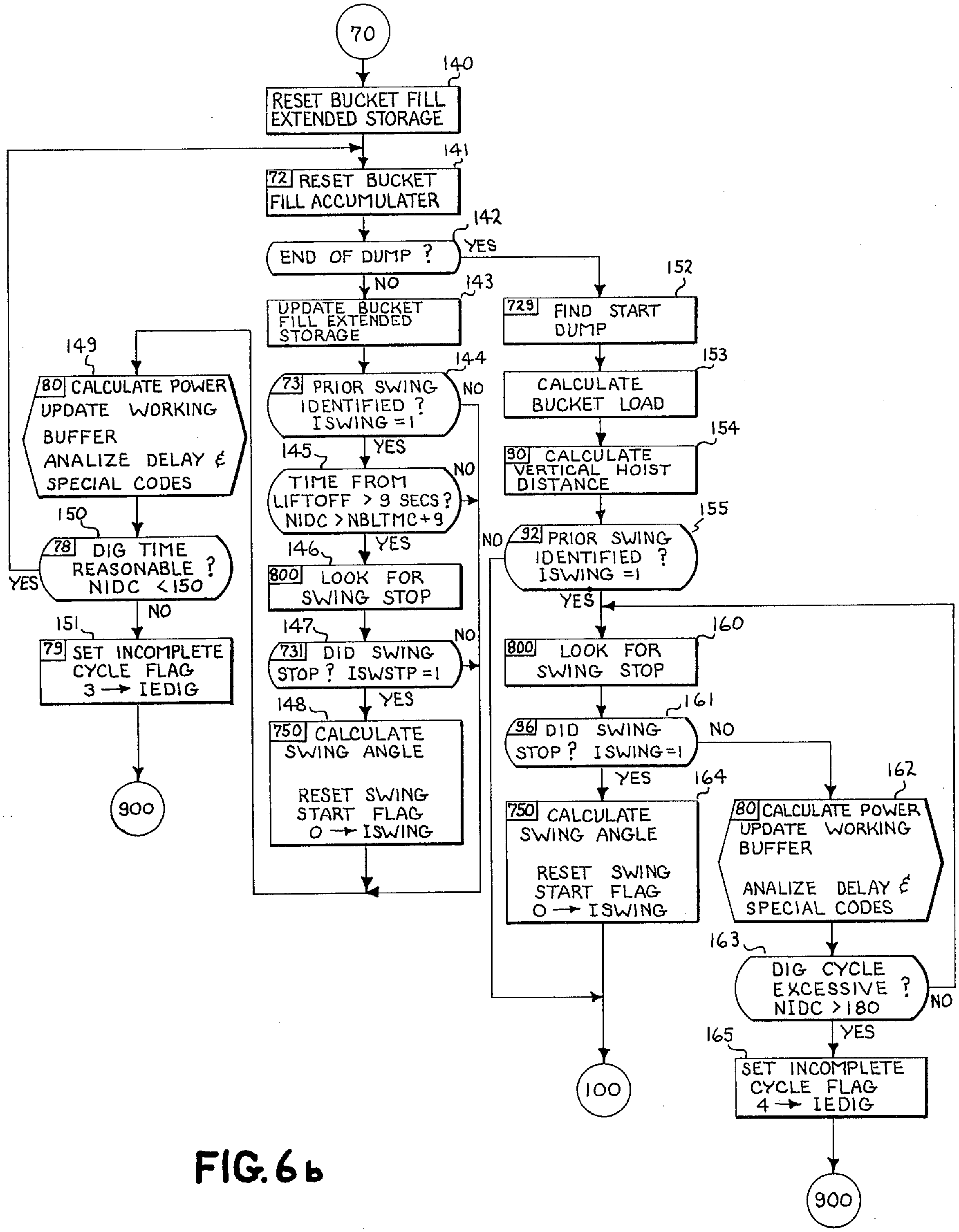
Figure 6C:
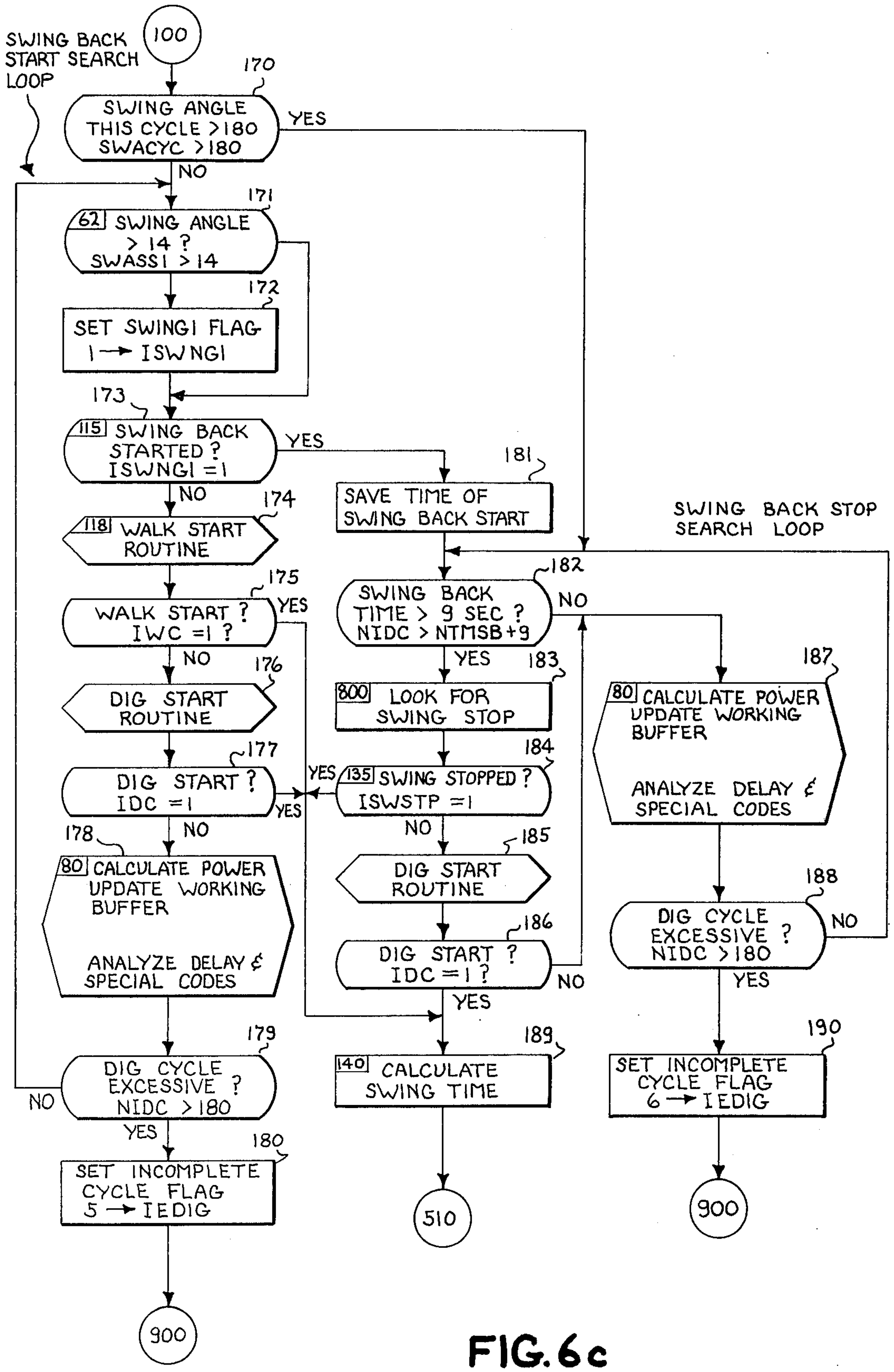
Figure 6D:
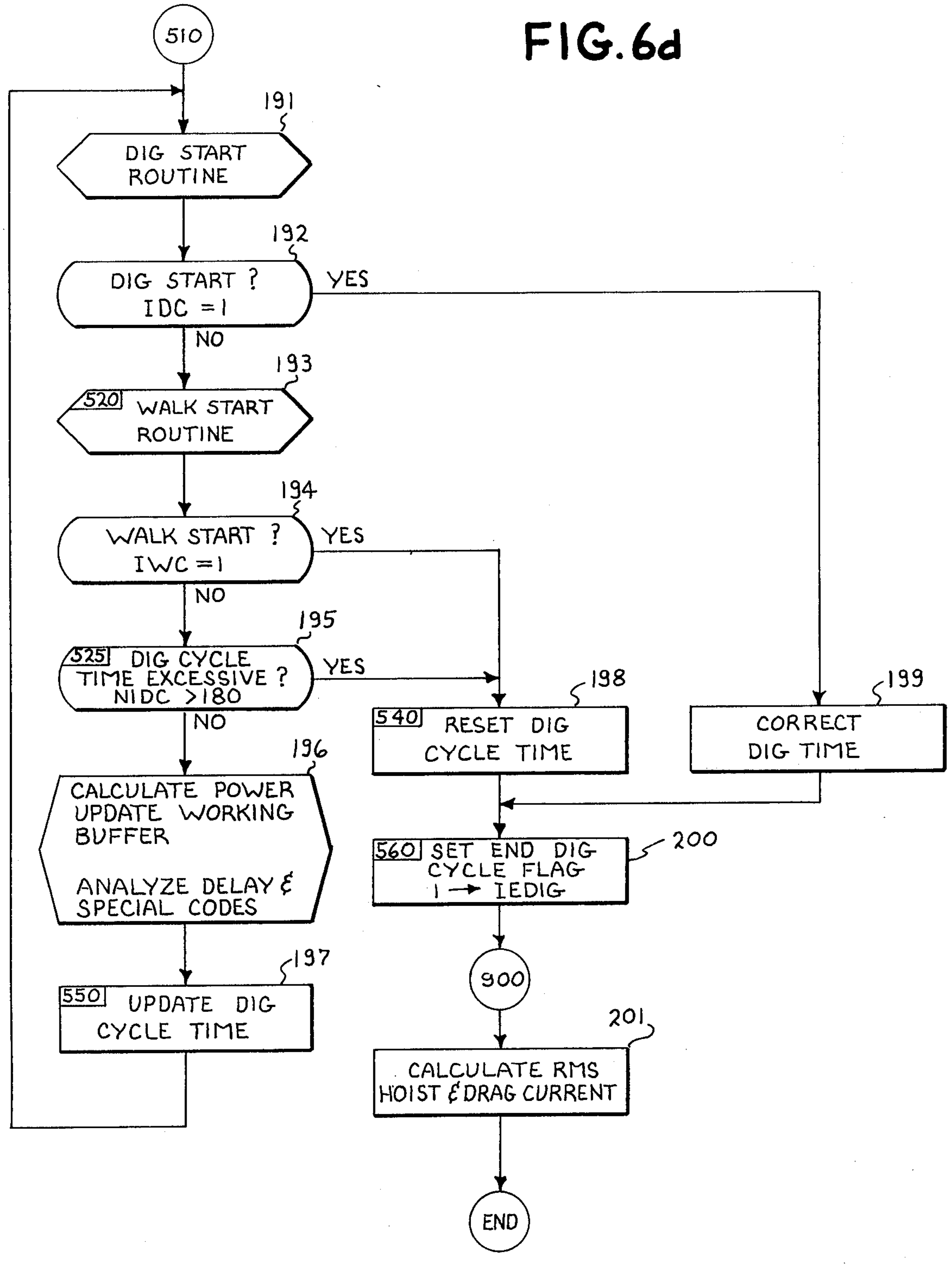

Once the WALKCY subroutine has determined that a walk cycle has started, further processing of the walk cycle information is performed by the WLKCAL subroutine. Referring now to FIG. 5, which is a flow chart of WLKCAL subroutine, the WLKCAL subroutine first initializes certain program parameters and then enters an end step search loop represented by flow chart elements 101 through 105. The end step test represented by flow chart element 101 requires that the drag motor current be regenerative for each of the first two seconds in the working buffer storage. If the end step test is not passed, the program will continue around the end step search loop by calling the PWRCAL subroutine which updates the power calculations, then calling the ADVWB subroutine which updates the flow of data through the working buffer section of the memory, then calling the DLYCAL subroutine which checks for the presence of any delay or special activity codes and then updates the parameters being accumulated during the walk cycle. A time limitation is placed on the length of time of the end step search loop. If the end step is not found within 30 seconds, the program, as indicated by flow charge element 102, ends the walk cycle. In this and in other program subroutines, wherein a search loop is utilized, time limitations are put in to allow a reasonable time for the searched condition to occur. If the condition does not occur in the specified time, the particular cycle is terminated so that the activity of the excavator can be more properly classified as delay cycle. If the end step test is passed, the program enters an end walk search loop as represented by flow chart elements 111 through 117. The end walk test, as represented by flow chart element 111, will be satisfied if either the drag cable or the hoist cable motion exceeds 15 feet between the time of the first sample in the working buffer and the time of the fifth sample in the working buffer. If the end walk test is not passed, the WLKCAL subroutine will then use the WALKCY subroutine to look for the start of another step. If no new step has begun, the power calculations will be updated, data will be advanced through the working buffer and the delay and special code analysis is performed before continuing the search for the end of the walk cycle. If a new step is detected, as indicated by flow chart element 114, the program will go back to the end step search loop. If the end walk test is passed, certain walk cycle parameters will be updated and the walk cycle will be ended, as indicated by flow chart elements 121, 122, and 123. If the end walk test is not found within 60 seconds after the start of the walk cycle, the walk cycle will be terminated, as indicated by flow chart element 112. As indicated by flow chart elements 104 and 116, the existence of tape errors will also cause a termination of the walk cycle.

LKCAL SUBROUTINE LISTING

```
   DIMENSION DAMPLT(2)
   DATA DAMPLT(1),DAMPLT(2)/ -1., -1./
   DATA NULL,FNULL
   1/0,0.0/
10 IW = IW + 1
   IEWALK = NULL
   NIWC = NULL
   NSTPTM = NULL
   WLKTIM = FNULL
   FNIWC = FNULL
   IF (IW .LE. 20) GO TO 20
   IW = 20
20 CONTINUE
   J = MACHID
   DO 22 I = 1,2
   IF (DAMPLT(J) - DAMP(I)) 30,22,22
22 CONTINUE
   GO TO 40
30 IF (NIWC .GT. 30) GO TO 50
   CALL PWRCAL
   CALL ADVWB
   CALL DLYCAL
   IF (IADVWB .GT. 2) GO TO 50
   CALL SCANTM
   FNIWC = FNIWC + FXTBLE(1)
   NIWC = NIWC + 1
   GO TO 20
40 CONTINUE
   IF (ABS (DRO(1) - DRO(5)) .GT. 15.) GO TO 50
   IF (ABS(HRO(1) - HRO(5) .GT. 15.) GO TO 50
   IF (NIWC .GT. 62) GO TO 50
   CALL WALKCY
   IF (IWC.EQ.1) GO TO 55
45 CONTINUE
```

-continued

LKCAL SUBROUTINE LISTING

```
      CALL PWRCAL
      CALL ADVWB
      CALL DLYCAL
      IF (IADVWB .GT. 2) GO TO 50
      CALL SCANTM
      FNIWC = FNIWC + FXTBLE(1)
      NIWC = NIWC + 1
      GO TO 40
50    CONTINUE
      IEWALK = 1
55    CONTINUE
      NSTPTM = NSTPTM + 1
      WLKTIM = WLKTIM + FNIWC
      IF (IEWALK .NE. NULL) GO TO 60
      FNIWC = FNULL
      NIWC = NULL
      GO TO 20
60    GO TO 90
90    RETURN
      END
```

During a typical digging cycle the bucket 18 is lowered to the ground and dragged through the coal overburden by taking in the drag cable 20. When the bucket 18 is full, the bucket will be raised by taking in the hoist cable 19. The excavator 10 will then rotate about the center pindle 14 until the bucket 18 is over a dump pile at which point the bucket 18 wil be emptied. The excavator 10 will again rotate about the center pindle 14 and lower the bucket 18 to the ground in order to begin a new digging cycle.

Figure 4:
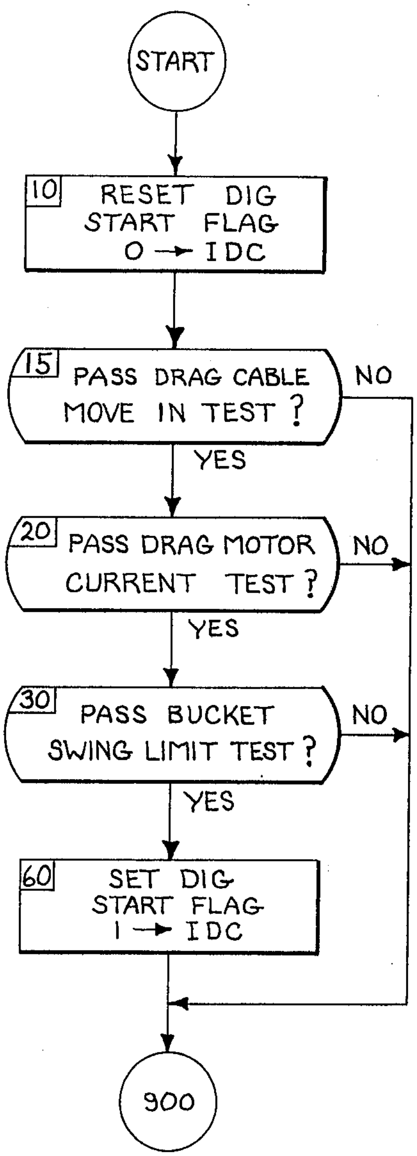
FIG. 4 is a flow diagram of the subroutine that is used to determine the start of a dig cycle.

The DIGCYS subroutine is used to determine if the excavator has started a digging cycle. As illustrated in FIG. 4, which is a flow chart of the DIGCYS subroutine, this program will indicate the beginning of a dig cycle if three conditions are fulfilled. The first test requires that at least 15 feet of drag cable must have been taken in from the time of the first sample until the time of the sixth sample stored in the working buffer. The second test requires that each of the first four drag motor currrent samples in the working buffer exceed 999 amperes. The third test requires that the excavator not swing more than 10° from the time of the first sample until the time of the sixth sample stored in the working buffer.

DIGCYS SUBROUTINE LISTING

```
      DIMENSION DRPSD(2), DAMPSD(2), SWASD(2)
      DATA DRPSD(1),DRPSD(2)/15.,15./
      DATA DAMPSD(1),DAMPSD(2)/999.,999./
      DATA SWASD(1),SWASD(2)/10.,10./
10    IDC = 0
      JM = MACHID
15    IF ((DRO(1) - DRO(6)) .GT. DRPSD(JM)) GO TO 20
      GO TO 900
20    CONTINUE
      DO 25 K = 1,4
      IF (DAMP(K) .LT. DAMPSD(JM) GO TO 900
25    CONTINUE
30    CONTINUE
      SSDIG = ABS(SWA(6) - SWA(1))
      IF (SSDIG .LT. 100.) GO TO 35
      SSDIG = 360. - SSDIG
35    CONTINUE
      IF (SSDIG .LT. SWASD(JM)) GO TO 60
      GO TO 900
60    IDC = 1
900   RETURN
      END
```

Figure 7A:
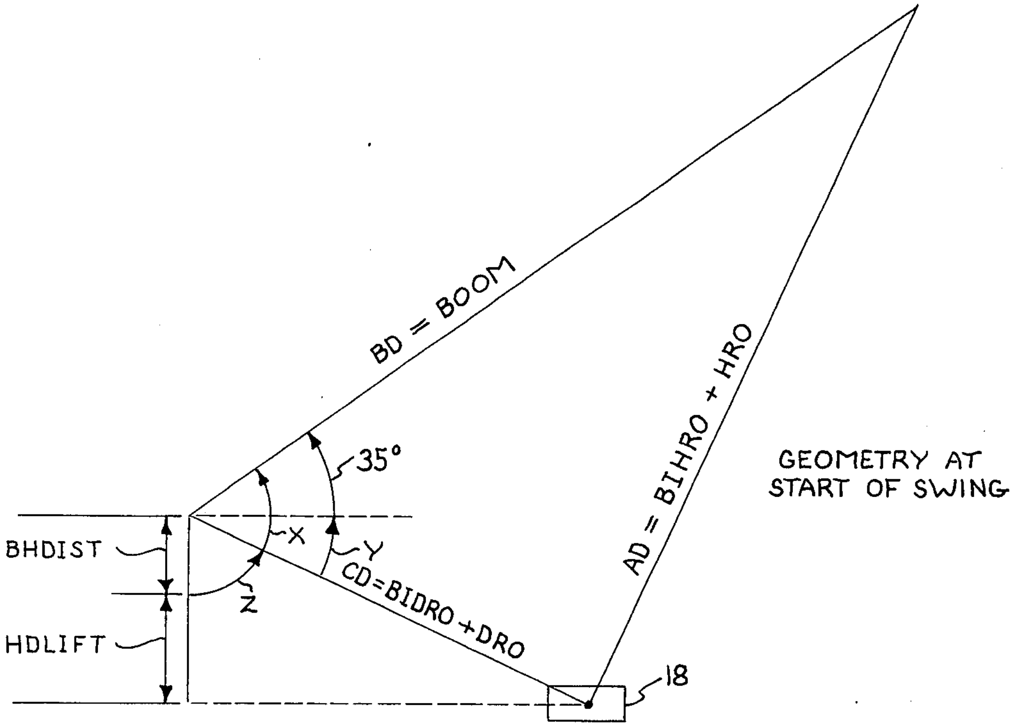
FIG. 7 depicts the geometry that is used as the basis for the vertical hoist distance computation in the dig cycle analysis subroutine.

After the DIGCYS subroutine determines that a digging cycle has started, further processing of digging cycle information is performed by the DIGCAL subroutine, which is shown in flow chart form in FIG. 6. The DIGCAL subroutine first initializes the parameters utilized in the program, as indicated by flow chart element 120. The program then enters the digging end search loop consisting of flow chart elements 121 through 134. The end of the digging phase of the digging cycle is noted by the lifting of the bucket. Two conditions must exist in order to pass the bucket lift-off test. The first condition is that the amount of drag cable let out from the time of the first sample to the time of the fifth sample, in the working buffer, must exceed 10 feet. The second condition is that the amount of hoist cable taken in from the time of the first sample to the time of the fifth sample, in the working buffer, must exceed 14 feet. If the lift-off test is not passed, the digging end search loop checks to see if the swing-to-dump phase of the digging cycle has begun. The swing start test, as indicated by flow chart element 123, requires that the difference between the first swing angle sample and the fifth swing angle sample in the working buffer exceeds 20° . If the swing start test is passed, the program will then update the parameter calculations, advance the data in the working buffer, and resume the search for the end of digging. If the time spent in the digging end search loop exceeds 140 seconds, the dig cycle is terminated, as indicated by flow chart elements 134 and 135. If the lift-off test is passed, the program then looks to see if a swing has already started and, if it has, the program proceeds to the end dump search loop, but if a swing was not started before lift-off, the program tests to see whether the swing-to-dump has begun. This swing start test requires that the difference between the first swing angle sample and the fifth swing angle sample in the working buffer exceeds 14° . If a swing has not started at the time of lift-off, it means thatthe lift-off was not for the purpose of preparing to dump but rather was for the purpose of moving the bucket so as to begin another pass through the coal overburden to further fill up the bucket. This fact is noted by setting the IMPASS flag and the program returns to the digging end search loop to look for another lift-off. When the start of a swing is detected, the time spent loading the bucket is saved, the swing angle at the start of the swing is saved and the vertical hoist distance at the start of the swing is calculated. The geometry showing the basis of the vertical hoist distance calculation at the start of the swing is shown in FIG. 7A. In FIG. 7A there is shown a triangle formed by the line BD, the line Ad, and the line CD. The line BD represents the boom which for one particular machine is 285 feet. The line AD represents the distance from the tip of the boom to the bucket 18 and the length of the line AD will be equal to the hoist cable length, HRO, plus a hoist cable bias which for this particular machine is 57 feet. The line CD represents the distance from the base of the boom to the bucket 18 and is equal to the drag cable length, DRO, plus a drag cable bias which for this particular machine is 67 feet. The vertical distance from the base of the boom to the bucket is shown to be equal to the distance BHDIST which is the hoist distance bias above ground which for this particular machine is 19 feet, plus th distance HDLIFT which represents the vertical hoist distance at the start of swing. The angle that the boom makes with the horizontal is 35° for this particular machine, the angle that the line CD makes with the horizontal is called Y, the angle that line CD makes with the vertical is called Z, and angle X is defined as equal to Y plus 35° . By making use of the following relationships the vertical hoist distance at the start of swing can be calculated.

$$X = \cos^{-1}\left[\frac{(BD)^2 + (CD)^2 - (AD)^2}{2(BD)(CD)}\right]$$

$$Y = X - 35$$
$$Z = 90 - Y$$
$$HDLIFT = (CD \cos Z) - BHDIST$$

Figure 7B:
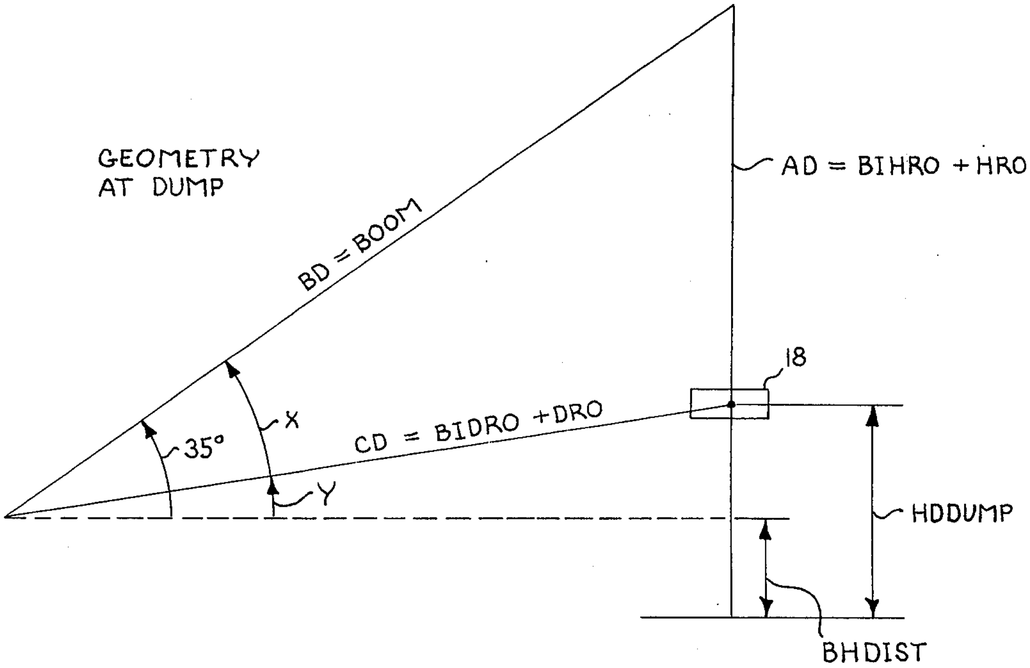

If a swing has started before lift-off, subsequent processing in the digging end search loop requires a test for determining whether the swing has terminated. At the start of the swing, the initial swing direction is noted as being either positive or negative. During the swing stop test, as represented by flow chart element 126, the swing direction over the first two seconds of data stored in the working buffer is determined by substracting the first swing angle sample from the third swing angle sample. This present swing direction is then noted as being either positive, negative, or zero and if this present swing direction does not equal the initial swing direction, noted at the start of the swing, the swing is terminated. The total swing angle wil be the difference between the swing angle at the start of the swing and the swing angle at the termination of the swing. After the detection of lift-off and the determination that the swing-to-dump has occurred, the program leaves the digging end search loop and enters the end dump search loop which consists of flow chart elements 141 through 150. Once the end of dump is located as denoted by flow chart element 142, the program then looks for the beginning of the dump as indicated by flow chart element 152 so that a calculation can be made of the bucket load and the vertical hoist distance at the start of dump, as indicated by flow chart elements 153 and 154. The program then makes sure that the swing-to-dump has terminated and then proceeds to the swing back start search loop indicated by flow chart elements 171 through 179. The end of dump test, indicated as flow chart element 142, requires that the ninth drag cable length is less than the seventh drag cable length in the working buffer. When the end of dump has been found, a search is made for the start of dump. The start of dump test requires that the hoist motor current falls to less than 90% of the average hoist motor current for some period of time prior to the start of dump. Since the start of dump can occur up to 7 seconds before the end of dump, and since the start of dump test requires a running average of the hoist motor current prior to the start of dump, it is necessary to extend the working buffer portion of memory to include the four hoist motor current samples that occur prior to the oldest hoist motor current sample in the working buffer section of memory. This extended working buffer section is called BFILL in this program. The average hoist motor current at the start of the dump provides an indication of the bucket load. For this particular excavator, a hoist motor current level of 2,200 amperes is assumed to represent a full bucket. A ratio of the average hoist motor current at the start of the dump to 2,200 amperes is multiplied by 100 to get the bucket load in percent. After the bucket load is calculated, the program calculates the vetical hoist distance at the start of dump. The geometry for the calculation of the vetical hoist distance at the start of dump is shown in FIG. 7B. In that Figure a triangle is formed by the lines BD, AD, and CD. The line BD represents the length of the boom and the line AD represents the distance from the tip of the boom to the bucket 18 and the line CD represents the distance from the base of the boom to the bucket 18. Again, the length of each side of the triangle is known or can be calculated since the length of the boom is fixed and the line AD is equal to the hoist cable length and the hoist cable bias distance, and the line CD is equal to the drag cable length plus the drag cable bias distance. The boom angle with respect to the horizontal is known to be 35°, the angle that side CD makes with the horizontal is called Y and the angle between lines CD and BD has been called X. The vertical hoist distance at dump is calculated by applying the following equations:

$$X = \cos^{-1}\left[\frac{(BD)^2 + (CD)^2 - (AD)^2}{2(BD)(CD)}\right]$$

$$Y = 35 - X$$
$$HDDUMP = (CD \cos Y) + BHDIST$$

After the vertical hoist distance at the start of dump has been calculated, the program continues to look for the termination of the swing-to-dump if the swing has not been terminated. Once the start of dump has been located and the swing-to-dump has terminated, the program will proceed to the swing back start search loop. If the dig cycle time should exceed 150 seconds while the program is in the end dump search loop, or if the dig cycle time should exceed 180 seconds while the program is looking for the termination of the swing-to-dump after the location of the start of dump, the dig cycle will be terminated. The swing back start test indicated as flow chart element 171 is the same test that is used to determine the start of the swing-to-dump after lift-off. If the start of the swing back is not detected, the program checks to see if a walk cycle has started or whether a new dig cycle has started which would be an indication that the present dig cycle has ended. If neither a walk cycle nor a dig cycle has started, the program will continue to search for the start of the swing back. If the swing back start has not been detected before 180 seconds has gone by in the dig cycle, the dig cycle will be terminated. When the swing back start test has been passed, the program will leave the swing back start search loop and enter the swing back stop search loop shown as flow chart elements 182 through 188. A nine second delay, as indicated by flow chart element 182 is inserted upon sensing the start of the swing back. This prevents the false indication of the swing back termination in certain cases. In other words, since the swing back start has been detected it is reasonable to assume that the swing will continue for at least 9 seconds. Again, if the termination of the swing back is not directly sensed, the program then looks for the start of another digging cycle which also would indicate that the swing back has been terminated. The dig cycle will be terminated if the swing back stop is not located before 180 seconds has gone by in the dig cycle. Upon sensing that the swing back has terminated, the program will calculate the swing time as indicated by flow chart element 189 and then proceed to the dig cycle end search loop consisting of flow chart elements 191 through 197. The dig cycle wil be terminated if a new dig or walk cycle has started or if the dig cycle time exceeds 180 seconds. If any of these three conditions exists, the dig cycle parameters are updated and the program control is returned to the subroutine that called the DIGCAL subroutine.

DIGCAL SUBROUTINE LISTING

```
      COMMON ISHFTB(156),SHFTBL(171)
      DIMENSION BFILL(4)
      DIMENSION AMPREF(2),BOOM(2),BANGLE(2)
     1,BHDIST(2),BIHRO(2),BIDRO(2)
      DATA SWASS1,SWASS2/14.,20./
      DATA HROLO,DROLO/10.,14./
      DATA AMPREF(1),AMPREF(2)/2200.,2200./
      DATA BOOM(1),BOOM(2)/285.,285./
      DATA BANGLE(1),BANGLE(2)/35.,35./
      DATA BHDIST(1),BHDIST(2)/19.,19./
      DATA BIHRO(1),BIHRO(2)/57.,57./
      DATA BIDRO(1),BIDRO(2)/67.,67./
      DATA TWOHND/200./
      DATA THSXTY/360./
      DATA RADS,PI02/57.29,1.5708/
      DATA NULL,FNULL/0,0.0/
10    NIDC = NULL
      IEDIG = NULL
      IREV = NULL
      IMPASS = NULL
      ISWING = NULL
      IPZERO = NULL
      JM = MACHID
      FNIDC = 1.0
      NTMSB = NULL
      DROSD = DRO(1) + BJDRO(JM)
      SWASD = SWA(1)
20    CONTINUE
      IF ((DRO(5) - DRO(1)) .LE. DROLO) GO TO 25
      IF ((HRO(1) - HRO(5)) .LE. HROLO) GO TO 25
      DO 22 I = 1,4
      IF (DRO(I + 1) .LT. DRO(I)) GO TO 25
22    CONTINUE
      GO TO 60
25    IF (ISWING .NE. 1) GO TO 30
      IRTN = 4
      GO TO 800
30    CONTINUE
      IPZERO = 0
      IF (SWA(1) .GT. SWA(5)) GO TO 32
      I = 5
      J = 1
      ISWDIR = 1
      GO TO 33
32    I = 1
      J = 5
      ISWDIR = -1
33    BIG = SWA(I)
      SMALL = SWA(J)
      DIFF = BIG - SMALL
      IF (DIFF .LT. TWOHND) GO TO 34
      BIG = THSXTY - BIG
      DIFF = BIG + SMALL
      ISWDIR = -ISWDIR
      IPZERO = 1
34    CONTINUE
      IF (DIFF .GT. SWASS2) GO TO 35
      GO TO 50
35    IREV = 1
      IRTNA = 1
40    CONTINUE
      NBLTMC = NIDC
      BD = BOOM(JM)
      AD = HRO(1) + BIHRO(JM)
      CD = DRO(1) + BIDRO(JM)
      COSAC = (BD * BD + CD * CD - AD * AD)/(2. * BD * CD)
      SINAC = SQRT(1. - COSAC * COSAC)
      TANAC = SINAC/COSAC
      AD = ATAN(TANAC)
      A3 = AD - (BANGLE(JM)/RADS)
      A1 = PI02 - A3
      HDLIFT = ABS(CD * COS(A1)) - BHDIST(JM)
      SWALO = SWA(1)
      ISWING = 1
      IF (IRTNA .EQ. 1) GO TO 50
      GO TO 70
50    CONTINUE
      CALL SCANTM
      DINC = FXTBLE(1)
      ADAMPC = ((FNIDC - DINC)/FNIDC * ADAMPC + DAMP(1) * DINC
      FNIDC
      IRTNB = 1
      GO TO 80
55    CONTINUE
      CALL SCANTM
      FNIDC = FNIDC + FXTBLE(1)
      NIDC = FNIDC
      IF (NIDC .LE. 140) GO TO 20
```

-continued

DIGCAL SUBROUTINE LISTING

```
      IEDIG = 2
      GO TO 900
60    CONTINUE
      IF (ISWING .EQ. 1) GO TO 70
      IRTND = 1
      GO TO 62
62    CONTINUE
      IPZERO = NULL
      ISWNG1 = NULL
      IF (SWA(1) .GT. SWA(9)) GO TO 63
      I = 9
      J = 1
      ISWDIR = 1
      GO TO 64
63    I = 1
      J = 9
      ISWDIR = -1
64    BIG = SWA(I)
      SMALL = SWA(J)
      DIFF = BIG - SMALL
      IF (DIFF .LT. TWOHND) GO TO 65
      BIG = THSXTY - BIG
      DIFF = BIG + SMALL
      ISWDIR = -ISWDIR
      IPZERO = 1
65    IF (DIFF .LE. SWASS1) GO TO 651
      ISWNG1 = 1
651   CONTINUE
      IF (IRTND .EQ. 1) GO TO 66
      IF (IRTND .EQ. 2) GO TO 115
      GO TO 900
66    CONTINUE
      IF (ISWNG1.EQ.1) GO TO 68
      IMPASS = 1
      GO TO 50
68    IRTNA = 2
      GO TO 40
70    CONTINUE
      DO 71 I = 1,4
      BFILL(I) = 1500.
71    CONTINUE
72    BFILLP = FNULL
      IF (DRO(9) .LT. DRO(8)) GO TO 729
      DO 721 I = 1,3
      BFILL(I) = BFILL(I + 1)
721   CONTINUE
      BFILL(4) = HAMP(1)
      GO TO 73
729   DO 722 I = 1,4
      BFILLP = BFILLP + BFILL(I)
722   CONTINUE
      BFILLP = BFILLP/4.
      BFILLN = 4.
      DO 723 I = 1,9
      IF (HAMP(I) .LT. (0.9 * BFILLP)) GO TO 724
      BFILLP = BFILLN * BFILLP/(BFILLN + 1.0) * HAMP(I)/(BFILLN + 1.0)
      BFILLN = BFILLN + 1.0
723   CONTINUE
724   CONTINUE
      BFILLP = (BFILLP/AMPREF(JM)) * 100.
      GO TO 90
73    CONTINUE
      IF (ISWING .EQ. 0) GO TO 75
      IF (NIDC .LT. (NBLTMC + 9)) GO TO 75
      IRTN = 1
      GO TO 800
731   IF (ISWSTP .NE. 1) GO TO 75
      IRTNS = 1
74    GO TO 750
75    CONTINUE
      IRTNB = 2
      GO TO 80
78    CONTINUE
      CALL SCANTM
      FNIDC = FNIDC + FXTBLE(1)
      NIDC = FNIDC
      IF (NIDC .LE. 150) GO TO 72
79    CONTINUE
      IEDIG = 3
      GO TO 900
90    CONTINUE
      BD = BOOM(JM)
      AD = HRO(I) + BIHRO(JM)
      CD = DRO(I) + BIDRO(JM)
      COSAC = (BD * BD +CD * CD - AD * AD)/(2. * BD * CD)
      SINAC = SQRT(1. - (COSAC * COSAC))
      TANAC = SINAC/COSAC
      AD = ATAN(TANC)
      A1 = (BANGLE(JM)/RADS) - AD
      HDDUMP = (CD * SIN(A1)) + BHDIST(JM)
      VHDCYC = HDLIFT + HDDUMP
92    CONTINUE
```

-continued

DIGCAL SUBROUTINE LISTING

```
      IF (ISWING .EQ. 0) GO TO 100
95    CONTINUE
      IRTN = 2
      GO TO 800
96    IF (ISWSTP .EQ. 1)GO TO 98
      IRTNC = 1
      GO TO 200
98    CONTINUE
      IRTNS = 2
      GO TO 750
100   CONTINUE
      IF (SWACYC .GT. 180.) GO TO 130
110   CONTINUE
      IRTND = 2
      GO TO 62
115   CONTINUE
      IF (ISWNG1 .NE. 1) GO TO 118
      NTMSB = NIDC
      GO TO 130
118   CONTINUE
      CALL WALKCY
      IF (IWC .NE. 0) GO TO 140
      CALL DIGCYS
      IF (IDC .NE. 0) GO TO 140
120   IRTNC = 2
      GO TO 200
130   CONTINUE
      IF (NIDC .LE. (NTMSB + 9)) GO TO 138
      IRTN = 3
      GO TO 800
135   CONTINUE
      IF (ISWSTP .EQ. 1) GO TO 140
      CALL DIGCYS
      IF (IDC .NE. 0) GO TO 140
138   CONTINUE
      IRTNC = 3
      GO TO 200
140   NSTIMC = NIDC - NBLTMC
      NBLTMC = NBLTMC - 1
      GO TO 500
500   CONTINUE
510   CONTINUE
      CALL DIGCYS
      IF (IDC .NE. 1) GO TO 520
      NIDC = NIDC - 1
      GO TO 560
520   CONTINUE
      CALL WALKCY
      IF (IWC .EQ. 1) GO TO 540
525   CONTINUE
      IF (NIDC .GT. 180) GO TO 540
530   CONTINUE
      IRTNB = 4
      GO TO 80
550   CONTINUE
      CALL SCANTM
      FNIDC = FNIDC + FXTBLE(1)
      NIDC = FNIDC
      GO TO 510
540   CONTINUE
      NIDC = NBLTMC + NSTIMC
560   CONTINUE
      IEDIG = 1
      GO TO 900
80    CONTINUE
      IPWFL = NULL
      CALL PWRCAL
      IPWFL = 1
      CALL PWRCAL
      CALL ADVWB
      CALL DLYCAL
      IF (IADVWB .LE. 2) GO TO 85
      IEDIG = 7
      GO TO 900
85    CONTINUE
      IF (IRTNB .EQ. 1) GO TO 55
      IF (IRTNB .EQ. 2) GO TO 78
      IF (IRTNB .EQ. 3) GO TO 220
      IF (IRTNB .EQ. 4) GO TO 550
      GO TO 900
200   CONTINUE
      IRTNB = 3
      GO TO 80
220   CONTINUE
      CALL SCANTM
      FNIDC = FNIDC + FXTBLE(1)
      NIDC = FNIDC
      IF (NICD .LE. 180) GO TO 240
230   CONTINUE
      IEDIG = IRTNC + 3
      GO TO 900
240   IF (IRTNC .EQ. 1) GO TO 95
```

-continued

DIGCAL SUBROUTINE LISTING

```
      IF (IRTNC .EQ. 2) GO TO 110
      IF (IRTNC .EQ. 3) GO TO 130
      GO TO 900
  750 CONTINUE
      IF (ISWDIR .EQ. -1) GO TO 753
      SWACYC = SWA(1) - SWALO
      GO TO 755
  753 CONTINUE
      SWACYC = SWALO - SWA(1)
      GO TO 755
  755 CONTINUE
      IF (SWACYC .GE. FNULL) GO TO 756
      SWACYC = SWACYC + 360.
  756 CONTINUE
      ISWING = NULL
      IF (IRTNS .EQ. 1) GO TO 75
      IF (IRTNS .EQ. 2) GO TO 100
      GO TO 900
  800 CONTINUE
      ISWSTP = NULL
      IF (SWA(1) .GT. SWA(3)) GO TO 802
      IF (SWA(1) .EQ. SWA(3)) GO TO 803
      NOWDIR = 1
      GO TO 804
  802 NOWDIR = -1
      GO TO 804
  803 CONTINUE
      NOWDIR = 0
  804 CONTINUE
      DIFF = ABS(SWA(1) - SWA(3))
      IF (DIFF .LT. TWOHND) GO TO 805
      NOWDIR = -NOWDIR
      IPZERO = 1
  805 CONTINUE
      IF (NOWDIR .EQ. ISWDIR) GO TO 807
      ISWSTP = 1
  807 CONTINUE
      IF (IRTN .EQ. 1) GO TO 731
      IF (IRTN .EQ. 2) GO TO 96
      IF (IRTN .EQ. 3) GO TO 135
      IF (IRTN .EQ. 4) GO TO 50
      GO TO 900
  900 CONTINUE
      RDAMPC = SQRT(RDAMPC)
      RHAMPC = SQRT(RHAMPC)
      RETURN
      END
```

Figure 8:
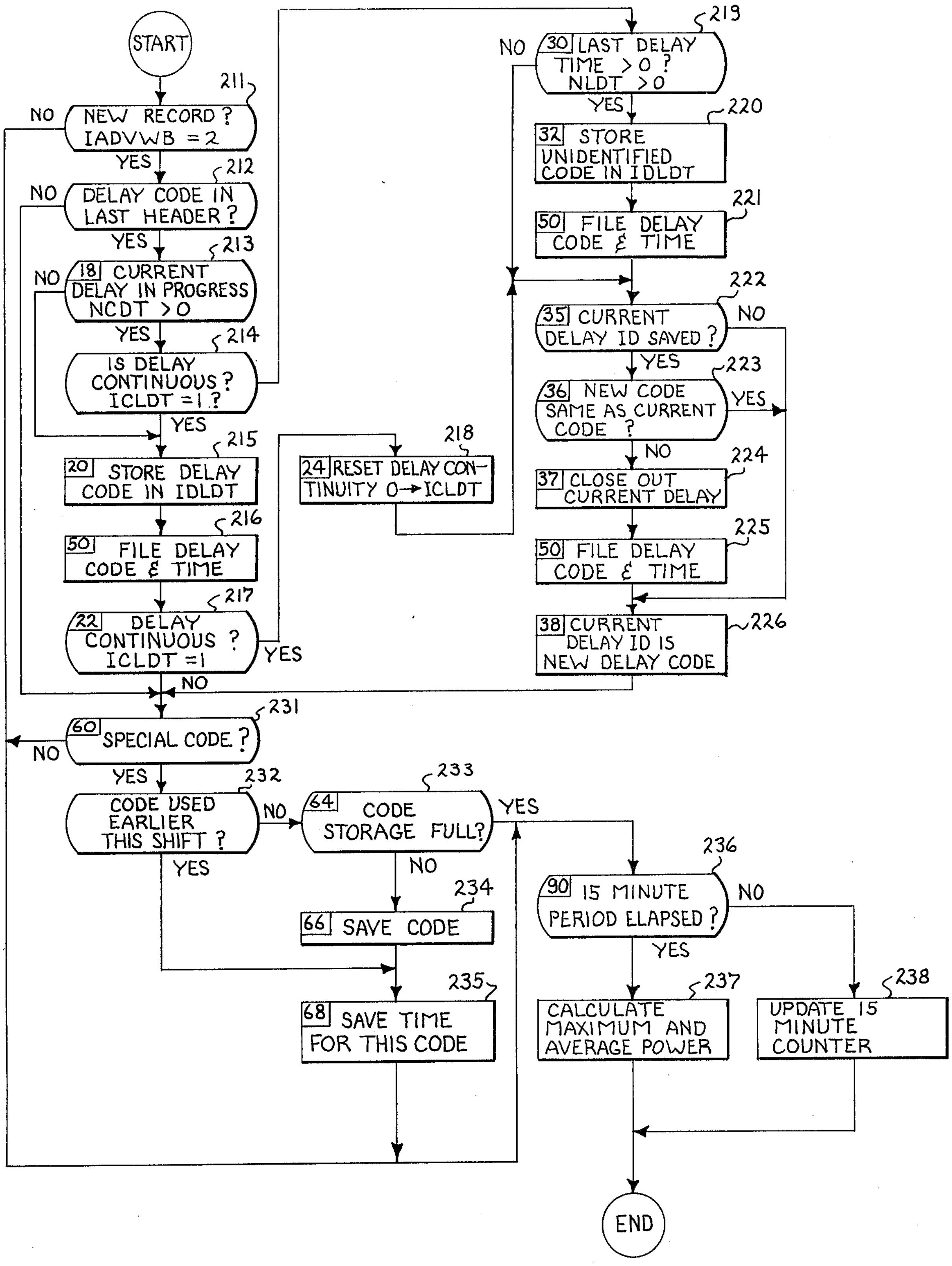
FIG. 8 is a flow diagram of the delay and special activities analysis subroutine.

The DLYCAL subroutine shown in flow chart form in FIG. 8 keeps track of the delay and special codes that are read from the tape. The delay and special codes are dialed on thumbwheel switches at the control panel and are entered by activating either a delay code entry switch or a special code entry switch. The special code entry switch must remain activated for the entire special activity time whereas the delay code entry switch need only be activated until the delay code is recorded on tape (up to 15 seconds). The processing of delay time information occurs both in this program subroutine and in the CYANL subroutine to be discussed later. These programs allow the operator to identify a delay either during the delay period or after the delay period but before the next delay period occurs. If the second delay period has started and the first delay has not been identified, the first delay period will be assigned an identity code 51. The DLYCAL subroutine uses the ICLDT flag which is set to indicate that a delay cycle has started and continues to be unidentified. The ICLDT flag is reset once the delay cycle terminates or if a delay code is received before the delay cycle ends. If the record read from the tape does not contain a delay code, the delay code processing consisting of flow chart elements 213 through 226 will be bypassed and the program will proceed to look for a special code. Flow chart elements 213, 215, and 216 assign the delay code to a prior delay cycle if there is no current delay cycle in progress. Flow chart elements 213 through 216 assign the delay code to the current delay cycle if the ICLDT flag is set.

Flow chart elements 213, 214, 219 through 221, assign a delay code 51 to an existent prior delay if there is a current delay cycle and the ICLDT flag is reset. Flow chart elements 222 through 226 assign delay codes when more than one delay code is received before a dig cycle or a walk cycle starts. If the delay codes are different, one delay cycle is terminated with the first delay code and another delay cycle is started with the second delay code.

If a special activity code is read from the header, the time duration of the special activity code is accumulated in the memory. In the particular program that was implemented a limitation was placed on the number of delay codes and special codes that could be stored for a single shift. The DLYCAL program can process up to 10 delay codes and up to 10 special codes in a single shift. The DLYCAL program also keeps track of the maximum power demand per 15 minute interval and the average power demand during the shift.

DLYCAL SUBROUTINE LISTING

```
10  IF (IADVWB .EQ. 1) GO TO 90
    IF (IADVWB .NE. 2) GO TO 90
15  IFS = 0
    IF (DCODE .EQ. 0) GO TO 60
18  IF (NCDT .EQ. 0) GO TO 20
    IF (ICLDT .EQ. 0) GO TO 30
20  IDLDT = DCODE
    IFS = 1
    GO TO 50
22  IF (ICLDT .EQ. 0) GO TO 60
24  ICLDT = 0
    GO TO 35
30  IF (NLDT .EQ. 0) GO TO 35
32  IDLDT = 51
    IFS = 2
    GO TO 50
35  IF (IDCDT .EQ. 0) GO TO 38
36  IF (IDCDT .EQ. DCODE) GO TO 38
37  NLDT = NCDT
    IDLDT = IDCDT
    NCDT = 0
    IFS = 3
    GO TO 50
38  IDCDT = DCODE
    GO TO 60
50  DO 51 I = 1,10
    IF (IDLDT .EQ. IDCODE(I)) GO TO 54
51  CONTINUE
    DO 52 I = 1,10
    IF (IDCODE(I) .EQ. 0) GO TO 53
52  CONTINUE
    GO TO 56
53  IDCODE(I) = IDLDT
54  DNLDT = NLDT
    DCTIME(I) = DCTIME(I) + DNLDT/3600.
56  CONTINUE
    NLDT = 0
    IDLDT = 0
    IF (IFS .EQ. 1) GO TO 22
    IF (IFS .EQ. 2) GO TO 35
    IF (IFS .EQ. 3) GO TO 38
60  IF (SCODE .EQ. 0) GO TO 90
    D0 62 I = 1,10
    IF (ISCODE(I) .EQ. SCODE) GO TO 68
62  CONTINUE
64  DO 65 I = 1,10
    IF (ISCODE(I) .EQ. 0) GO TO 66
65  CONTINUE
    GO TO 69
66  ISCODE(I) = SCODE
68  SCTIME(I) = SCTIME(I) + 15./3600.
69  GO TO 90
90  CONTINUE
    IF (I15MIN .GE. 822) GO TO 92
    I15MIN = I15MIN + 1
    GO to 900
92  IF (DMANDC .LE. DMDMAX) GO TO 93
    DMDMAX = DMANDC
95  I15MIN = 0
    ITIMES = ITIMES + 1
    FN15MN = ITIMES
    AVEDMD = (FN15MN - 1.0)/FN15MN) * AVEDMD + DMANDC/FN15MN
    DMANDC = 0.0
900 RETURN
    END
```

Figure 9A:
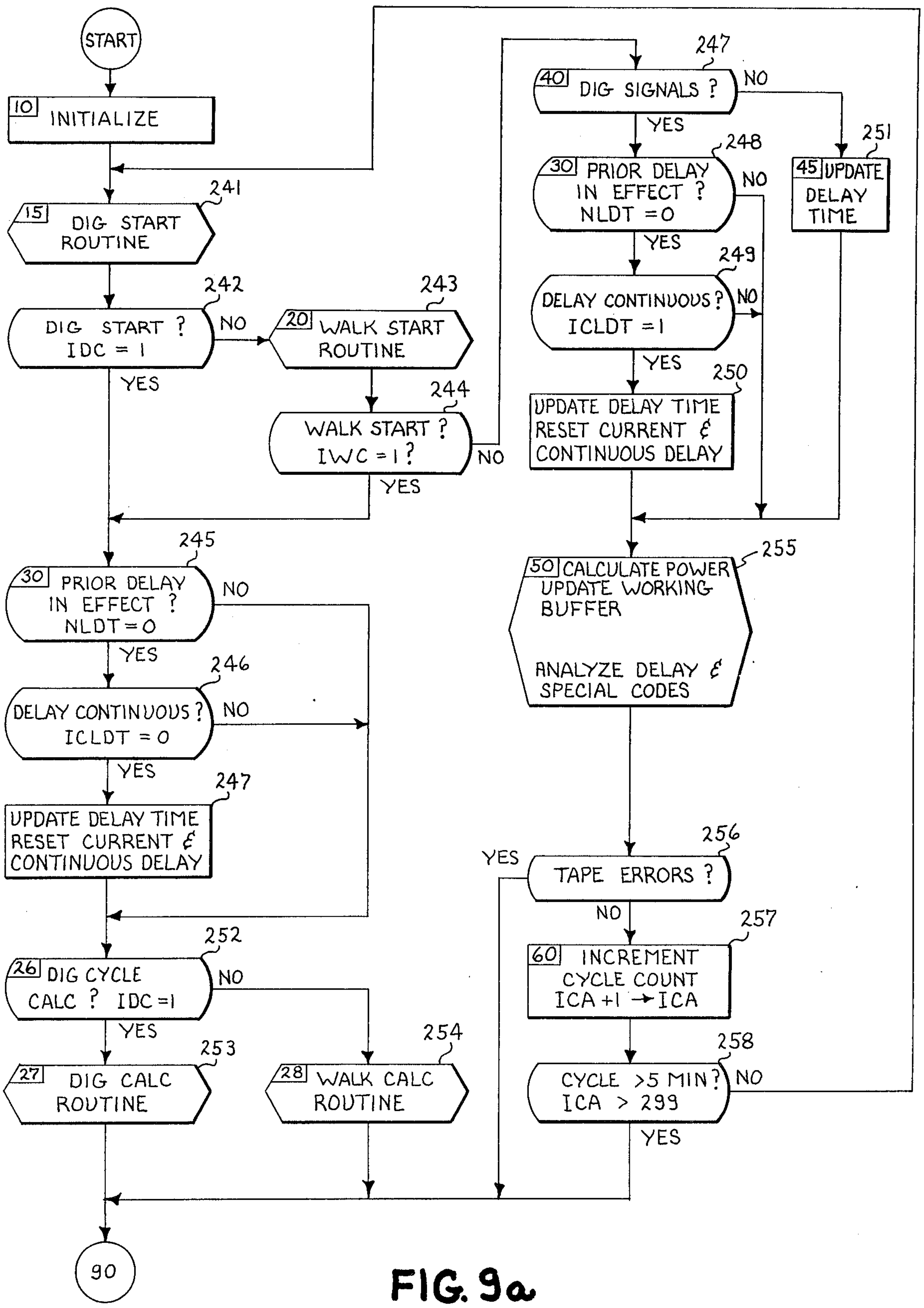
FIG. 9 is a flow diagram of the cycle analysis subroutine that controls the dig start, walk start, dig signals analysis, walk signals analysis, and the delay and special codes analysis subroutines in order to identify the excavator activity.
Figure 9B:
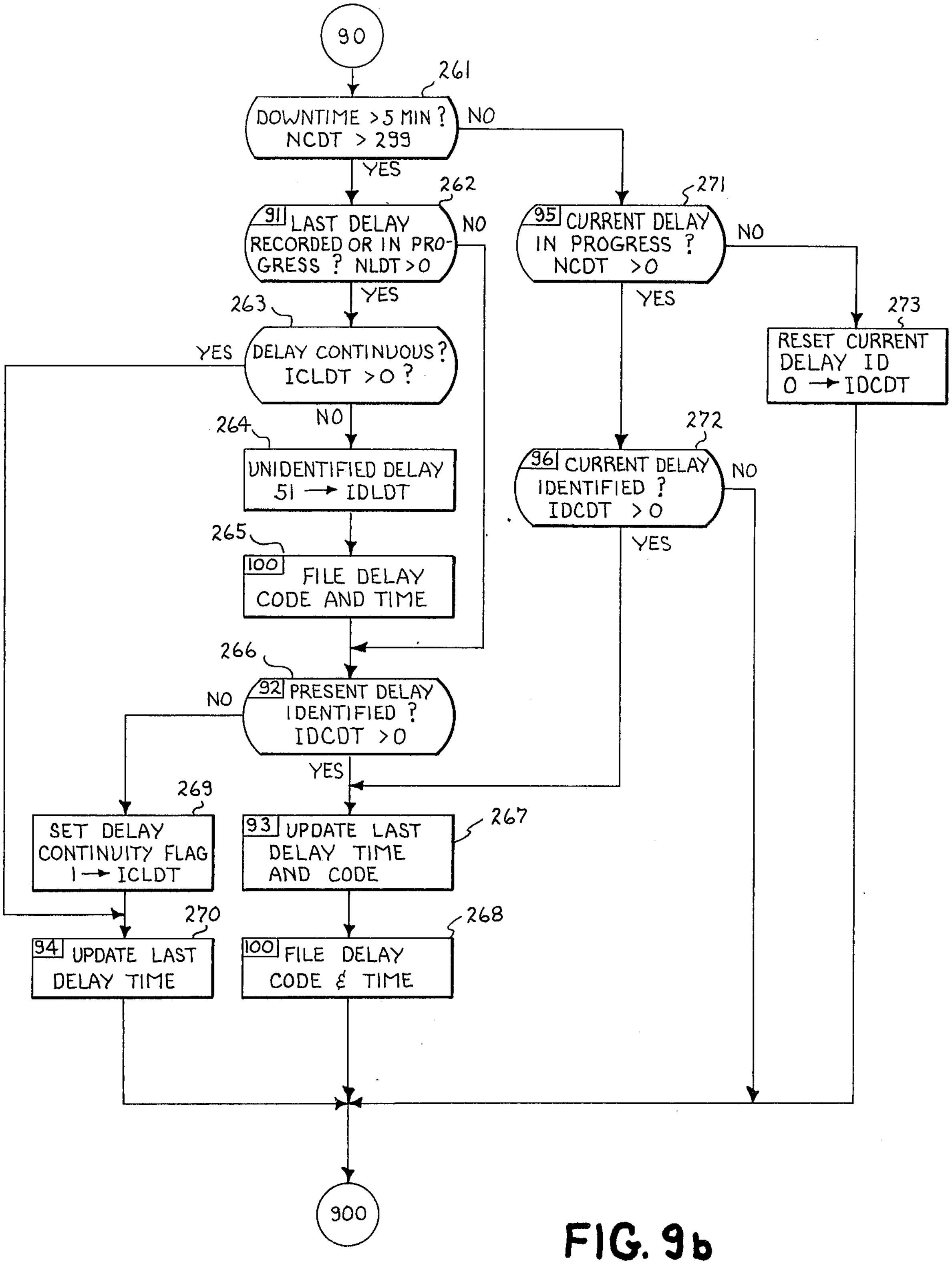

The CYANL program subroutine controls the DIGCYS, DIGCAL, WALKCY, and WALKCAL subroutines in order to analyze the type of activities being performed by the excavator. The CYANL subroutine, as shown in FIG. 9, first calls the DIGCYS subroutine to determine if a dig cycle is starting. If a dig cycle is not beginning, the WALKCY subroutine will be called to determine if a walk cycle is starting. If the excavator is not beginning a walk cycle, a check will be made to see if the excavator is digging. The digging test requires that either the drag motor current or the hoist motor current exceed 500 amperes for the first, fifth, and ninth samples in the working buffer section of the memory. If the digging test is not passed, it is assumed that the excavator is in a delay condition and the delay time is updated. The CYANL program then updates the power calculation, advances the working buffer storage, calls for the analysis of the delay and special codes and then returns to search for the start of a digging cycle. If either a dig cycle or a walk cycle has started, a check is made to see if a delay has been in effect and if one has been in effect, the delay time is updated and the ICLDT flag is reset indicating that the delay has now been terminated by the presence of either the dig start or walk start cycle. The CYANL program then calls either the dig calculation or the walk calculation program as appropriate. Similarly, if digging signals are present, the prior delay is updated and the ICLDT flag is reset before the parameters of the cycle are updated and the data advanced through the working buffer storage. After the CYANL subroutine completes the dig cycle analysis or the walk cycle analysis or if the CYANL subroutine should spend more than 5 minutes accumulating digging signals or delay time, the CYANL subroutine continues to process the delay information as shown in flow chart elements 261 through 273. Thus, if the current delay time exceeds 5 minutes and there was a prior delay, the prior delay is assigned the identification code 51, and the prior delay will then be filed away. If the ICLDT flag is set, indicating that the current delay is part of a continuing delay, the delay time is updated, as indicated by flow chart element 270. If the current delay is greater than 0 but less than 5 minutes and the current delay is identified, the delay information will be filed away.

CYANL SUBROUTINE LISTING

```
      DIMENSION HAMPD(2),DAMPD(2)
      DATA HAMPD(1),HAMPD(2),DAMPD(1),DAMPD(2)/500.,500.,500.,
      500./
      DATA NULL,FNULL/0,0.0/
10    ICA = NULL
      NCDT = NULL
      IDC = NULL
      IWC = NULL
      FNCDT = FNULL
      TKWHCA = FNULL
      NSTIMC = NULL
      NBLTMC = NULL
      DROSD = FNULL
      RDAMPC = FNULL
      ADAMPC = FNULL
      RHAMPC = FNULL
      DCKWH = FNULL
      PEAKWC = FNULL
15    CONTINUE
      CALL DIGCYS
      IF (IDC .EQ. 1) GO TO 23
20    CONTINUE
      CALL WALKCY
      IF (IWC .EQ. 1) GO TO 23
      GO TO 40
23    JDL = 1
      GO TO 30
26    IF (IDC .NE. 1) GO TO 28
27    CONTINUE
      CALL DIGCAL
      GO TO 90
28    CONTINUE
      CALL WLKCAL
      GO TO 90
30    IF (NLDT .EQ. NULL) GO TO 35
      IF (ICLDT .NE. 1) GO TO 35
      NLDT = NLDT + NCDT
      NCDT = NULL
      ICLDT = NULL
35    IF (JDL .NE. 1) GO TO 50
      JDL = NULL
      GO TO 26
40    DO 42 I = 1,9,4
      IF (ABS(HAMP(I)) .GE. HAMPD(MACHID)) GO TO 44
      IF (ABS(DAMP(I)) .GE. DAMPD(MACHID)) GO TO 44
42    CONTINUE
      GO TO 45
44    JDL = NULL
      GO TO 30
45    CONTINUE
      CALL SCANTM
      FNCDT = FNCDT + FXTBLE(1)
      NCDT = FNCDT
50    CONTINUE
      CALL PWRCAL
      CALL ADVWB
      CALL DLYCAL
      IF (IADVWB .GT. 2) GO TO 90
60    ICA = ICA + 1
      IF (ICA .GT. 299) GO TO 90
      GO TO 15
90    CONTINUE
      IFS = 0
      IF (NCDT .LE. 299) GO TO 95
91    CONTINUE
      IF (NLDT .EQ. NULL) GO TO 92
      IF (ICLDT .GT. NULL) GO TO 94
      IDLDT = 51
      IFS = 1
      GO TO 100
92    CONTINUE
      IF (IDCDT .GT. NULL) GO TO 93
      ICLDT = 1
      GO TO 94
93    NLDT = NCDT
      IDLDT = IDCDT
      IFS = 2
      GO TO 100
94    CONTINUE
      NLDT = NLDT + NCDT
      GO TO 200
```

-continued

CYANL SUBROUTINE LISTING

```
95   IF (NCDT .GT. NULL) GO TO 96
     IDCDT = NULL
     GO TO 200
96   IF (IDCDT .EQ. NULL) GO TO 200
     GO TO 93
100  CONTINUE
     DO 102 I = 1,10
     IF (IDLDT .EQ. IDCODE(I)) GO TO 104
102  CONTINUE
     DO 103 I = 1,10
     IF (IDCODE(I) .EQ. NULL) GO TO 1031
103  CONTINUE
     GO TO 106
1031 IDCODE(I) = IDLDT
104  DNLDT = NLDT
     DCTIME(I) = DCTIME(I) + DNLDT/3600.
106  CONTINUE
     NLDT = NULL
     IDLDT = NULL
107  IF (IFS .EQ. 2) GO TO 200
     GO TO 92
200  GO TO 900
900  RETURN
     END
```

The SFTANL program controls the calling of the CYANL, cycle analysis, subroutine and accumulates all of the information that is calculated during the analysis of one shift. The shift analysis program is quite straightforward and one skilled in the programming art can easily follow this program by reading the program listing as provided below. For that reason, a flow chart of this program is not provided. The primary function of the shift analysis program is to control the calling of the cycle analysis program. After the cycle analysis subroutine is completed, program control is returned to the shift analysis program with dig cycle data, walk cycle data, or delay data or with a flag indicating that tape errors have occurred. If either a dig cycle or a walk cycle is determined, the different parameters associated with those cycles are calculated and stored for summary at the end of the shift. The shift analysis program also looks at the time data and when the time on the tape indicates that the shift has come to an end, the shift analysis program then closes out any delay segment existing at the end of the shift. The shift analysis program also keeps a count of the number of tape errors that are detected and at the end of the shift the number of tape errors is printed out which provides an indication of the quality of the data that has been processed.

SFTANL SUBROUTINE LISTING

```
     COMMON ISHFTB(156),SHFTBL(171)
     DIMENSION FDUMVT (194)
     EQUIVALENCE (FDUMVT(1),STIME)
     DIMENSION FIDG(77),IESTMH(6)
     DIMENSION ILMTL(3),ILMTU(3)
     DATA FIDG(1),FIDG(2),FIDG(3),FIDG(4),FIDG(5),FIDG(6),
     FIDG(7)
     1/30.,60.,80.,100.,120.,150.,180./
     DATA IESTMH(1),IESTMH(2)
     1/1,6/
     DATA IESTMH(3),IESTMH(4)
     1/2,4/
     DATA IESTMH(5),IESTMH(6)
     1/0,8/
     DATA ILMTL(1),ILMTL(2),ILMTL(3)/2880,5760,0000/
     DATA ILMTU(1),ILMTU(2),ILMTU(3)/5759,8639,2879/
     DATA SECHR/3600./
     DATA NULL,FNULL,FONE/0,0.0,1.0/
     DATA FTEN/10./
     DATA FHUN/100./
     DATA N/2/
100  CONTINUE
     IF (IDATER .NE.99) GO TO 200
     IDATER = NULL
     IDSEG = 1
     CALL ADVWB
     IF (IADVWB .GT. 2) GO TO 105
     J = ISHIFT
     IF ( ITIMEX .GE. ILMTL(J) .AND. ITIMEX .LE. ILMTU(J))
     GO TO 15
     IDATER = 1
105  CONTINUE
     IESHFT = 1
     GO TO 60
200  CONTINUE
     DO 202 I = 1,194
     FDUMVT(I) = FNULL
202  CONTINUE
     ITWAIT = NULL
     ITIMES = NULL
     IESHFT = NULL
     ITERR = NULL
     ITECNT = NULL
10   CONTINUE
```

-continued

SFTANL SUBROUTINE LISTING

```
      IF (IDATER .EQ. 1) GO TO 11
      IDSEG = 1
      CALL ADVWB
      IF (IADVWB .GT. 2 GO TO 360
11    J = ISHIFT
      IF (J .EQ. 1) GO TO 111
      IF (J .EQ. 2) GO TO 111
      IF (J. EQ. 3) GO TO 111
      GO TO 12
111   CONTINUE
      IF ( ITIMEX .GE. ILMTL(J) . AND . ITIMEX .LE. ILMTU(J))
      GO TO 140
12    CONTINUE
      DO 13 I = 1,3
      IF ( ITIMEX .GE. ILMTL(I) .AND. ITIMEX .LE. ILMTU(I))
      GO TO 14
13    CONTINUE
14    ISHIFT = I
140   CONTINUE
      J = ISHIFT
      IF(J .NE. 3) GO TO 142
      K = NULL
      L = NULL
      GO TO 145
142   CONTINUE
      IF(J .NE. 1) GO TO 143
      I = 5
      GO TO 144
143   CONTINUE
      I = 1
144   K = IESTMH(I)
      L = IESTMH(I + 1)
145   CONTINUE
      IBIIMH(1) = K
      IBIIMH(2) = L
146   IBTIMM(1) = NULL
      IBTIMM(2) = NULL
15    CONTINUE
      BFILLP = FNULL
      SWACYC = FNULL
      VHDCYC = FNULL
      IEDIG = NULL
      NIDC = NULL
      CALL CYANL
      IF (IADVWB .NE. 5) GO TO 16
151   CONTINUE
      ITERR = ITERR + 1
      ITECNT = ITECNT + 1
      GO TO 17
16    IF (ITERR .EQ. 0) GO TO 17
      ITERR = 1
17    CONTINUE
      J = ISHIFT
      IF(ITIMEX .GE. ILMTL(J) .AND. ITIMEX .LE. (ILMTU(J))
      GO TO 20
18    IESHFT = 1
      IDATER = 0
20    CONTINUE
      IF (NIDC .LE. 1) GO TO 24
22    IF (IEDIG .NE. 1) GO TO 50
      GO TO 40
24    CONTINUE
      IF (WLKTIM .EQ. 0.0) GO TO 50
30    CONTINUE
      NOSTEP = NOSTEP + NSTPTM
      WALKTM = WALKTM + WALKTIM/SECHR
      WLKTIM = FNULL
      GO TO 50
40    CONTINUE
      FNIDC = NIDC
      PRODTM = PRODTM + FNIDC/SECHR
      NDIGCY = NDIGCY + 1
      FDIGCY = NDIGCY
      RFDIGC = (FDIGCY - 1.0)/FDIGCY
      AVCYT = RFDIGC * AVCYT + FNIDC/FDIGCY
      AVANGL = RFDIGC * AVANGL + SWACYC/FDIGCY
      DO 44 I = 1,7
      IF (SWACYC .LE. FIDG(I)) GO TO 45
44    CONTINUE
      I = I + 1
45    NOSWG(I) =0 NOSWG(I) + 1
46    CONTINUE
      IAVSWT = IAVSWT + NSTIMC
      IAVBKT = IAVBKT + NBLTMC
      PCBUCK = PCBUCK * RFDIGC + BFILLP/FDIGCY
47    IF (IMPASS .EQ. 0) GO TO 48
      NOMDRG = NOMDRG + 1
48    CONTINUE
      AVDRGR = AVDRGR * RFDIGC + DROSD/FDIGCY
      AVHOSR = AVHOSR * RFDIGC + VHDCYC/FDIGCY
      AVDRGA = AVDRGA * RFDIGC + ADAMPC/FDIGCY
      RMSDRA = RMSDRA * RFDIGC + RDAMPC/FDIGCY
```

-continued

SFTANL SUBROUTINE LISTING

```
      RMSHOS = RMSHOS * RFDIGC + RHAMPC/FDIGCY
      AVKWHC = AVKWHC * RFDIGC + DCKWH/FDIGCY
      AVPEKW = AVPEKW * RFDIGC + PEAKWC/FDIGCY
      IMPASS = NULL
      IF (PEAKWC .LT. PEAKW) GO TO 50
      PEAKW = PEAKWC
 50   CONTINUE
 54   TOTKWH = TOTKWH + TKWHCA/FHUN
      IF (IESHFT .EQ. 1) GO TO 60
      IF (IADVWB .GT. 2) GO TO 300
      GO TO 15
 60   CONTINUE
      J = ISHIFT * 2 - 1
      IETIMH(1) = IESTMH(J)
      IETIMH(2) = IESTMH(J + 1)
      IETIMM(1) = NULL
      IETIMM(2) = NULL
 65   CONTINUE
      IF (ITERR .NE. 1) GO TO 70
      WRITE(N,500)ITECNT,ISHIFT
500   FORMAT (1HO,4X,I3,2X,20HTAPE ERRORS IN SHIFT,1X,I1)
      ITERR = NULL
 70   CONTINUE
      IF (NLDT .EQ. 0) GO TO 80
      IF (IDLDT .NE. 0) GO TO 72
      IDLDT = 51
 72   CONTINUE
      DO 73 I = 1,10
      IF (IDLDT .EQ. IDCODE(I)) GO TO 78
 73   CONTINUE
      DO 74 I = 1,10
      IF (IDCODE(I) .EQ. 0) GO TO 76
 74   CONTINUE
      GO TO 80
 76   CONTINUE
      IDCODE(I) = IDLDT
 78   DNLDT = NLDT
      DCTIME(I) = DCTIME(I) + DNLDT/3600.
 80   CONTINUE
      WRITE(2,501)ISHIFT
501   FORMAT(1HO,4X,18HEND ANALYSIS SHIFT,1X,I1)
      GO TO 900
300   CONTINUE
      IF (IADVWB .NE. 5) GO TO 310
      IF (ITERR .LE. 6) GO TO 305
      WRITE(N,301) (BCDDAT(I),I = 1,6)
301   FORMAT(1HO,4X,16HMANY TAPE ERRORS,2X,
      130HSHIFT ANALYSIS ABORTED AT TIME,3(2X,2I1))
      IDATER = 0
      GO TO 70
305   CONTINUE
      CALL ADVWB
      IF (IADVWB .EQ. 5) GO TO 151
      GO TO 15
310   CONTINUE
      IF (IADVWB .NE. 6) GO TO 315
      IDATER = 8
      GO TO 900
315   CONTINUE
      IF (IADVWB .NE. 3) GO TO 330
320   IDATER = 20
      GO TO 900
330   CONTINUE
      IF(IADVWB. NE. 4) GO TO 350
340   IDATER = 30
      GO TO 900
350   CONTINUE
      GO TO 15
360   CONTINUE
      WRITE(N,361)ISHIFT
361   FORMAT(1H0,4X,24HFIRST RECORD ERROR,SHIFT,2X,I2)
      IF (IADVWB .EQ. 6) GO TO 310
      IF (ITWAIT .NE. 0) GO TO 365
      ITWAIT = 1
      GO TO 10
365   CONTINUE
      WRITE (N,367)
367   FORMAT(1H0,4X,28HSHIFT ANLAYSIS NOT PERFORMED)
      WRITE (N,368)
368   FORMAT (1H, 7X,23HMANY DATA RECORD ERRORS)
      IDATER = 10
      GO TO 900
900   CONTINUE
      RETURN
      END
```

The EXCANL or executive analysis program interfaces with the operator and allows him to select either a normal log, which includes three shift reports and a daily report, or an abnormal log which consists of selected specific shift reports. The EXCANL program locates the requested shift data on the tape and then calls the SFTANL, or shift analysis program, to process the data. After the shift analysis program has caused all the data for the shift to be processed and accumulated, the calculated shift parameters will be transferred to a section of memory called the shift table from which the printed reports will ultimately be generated. The transfer of the calculated shift parameters to the shift table is accomplished by the MOVDAT, or move data, subroutine which is listed below. The EXCANL, or executive analysis program, will then proceed to analyze the data for the next shift requested by the operator.

EXCANL SUBROUTINE LISTING

```
      COMMON ISHFTB(156),SHFTBL(171)
      DIMENSION ISBUF(24),ISHFTS(3)
      DIMENSION IDUMVT(17)
      EQUIVALENCE (IDUMVT(1),MACHID)
      DIMENSION ISTMEL(3),ISTMEU(3)
      DATA ISTMEL(1),ISTMEL(2),ISTMEL(3)
      1/8,16,0/
      DATA ISTMEU(1),ISTMEU(2),ISTMEU(3)
      1/16,24,8/
      DATA N,NIN,NOUT/2,2,2/
      DATA NULL,FNULL/0,0.0/
10    CONTINUE
      INPTY = NULL
      ITAPE = NULL
      INPT = NULL
      IDATER = NULL
      ISTAT = NULL
      JSKIP = NULL
      IDCNT = NULL
      ISF = NULL
      IFRST = NULL
      IHRPRE = 100
      DO 11 I = 1,156
      ISHFTB(I) = NULL
11    CONTINUE
      DO 12 I = 1,171
      SHFTBL(I) = FNULL
12    CONTINUE
      DO 15 I = 1,12
      BCDDAT(I) = NULL
15    CONTINUE
      DO 16 I = 1,105
      BINDAT(I) = FNULL
16    CONTINUE
      DO 20 I = 1,17
      IDUMVT(I) = NULL
20    CONTINUE
30    DO 31 I = 1,24
      ISBUF(I) = NULL
31    CONTINUE
      DO 32 I = 1,3
      ISHFTS(I) = NULL
32    CONTINUE
40    CONTINUE
      WRITE(NOUT,41)
41    FORMAT(1H1,4X,37HTYPE 1 FOR NORMAL LOG, 2 FOR
      ABNORMAL)
      READ(NIN,42)INPT
42    FORMAT(I1)
      WRITE(NOUT,43)
43    FORMAT(1H0,17HTYPE IN YEAR XXXX)
      READ(NIN,44) INPTY
44    FORMAT(I4)
      IF (INPT .NE. 1) GO TO 46
      IDCNT = 3
      GO TO 200
46    CONTINUE
      WRITE(NOUT,47)
47    FORMAT(1H0,4X,31HINPUT SHIFTS ABNORMAL LOG X,X,X)
      READ(NIN,48) (ISHFTS(I), I = 1,3)
48    FORMAT(I1,1X,I1,1X,I1)
      DO 49 I = 1,3
      IF (ISHFTS(I) .LT. 1) GO TO 49
      IF (ISHFTS(I) .GT. 3) GO TO 49
      GO TO 50
49    CONTINUE
      GO TO 46
50    CONTINUE
      DO 51 I = 1,3
      IF (ISHFTS(I) .LE. 3) GO TO 51
      ISHFTS(I) = 0
51    CONTINUE
      DO 52 I = 1,3
      IF (ISHFTS(I) .NE. 0) GO TO 55
52    CONTINUE
      WRITE(NOUT,53)
53    FORMAT(1HO,4X,47HCOMPLETED ABNORMAL ANALYSIS. LOAD
      LOG AND START)
      GO TO 900
55    CONTINUE
      ISF = ISHFTS(I)
      ISHFTS(I) = NULL
      IF (IFRST .EQ. 0) GO TO 56
      IHRPRE = 100
      GO TO 72
```

-continued

EXCANL SUBROUTINE LISTING

```
56    IFRST = 1
      GO TO 60
60    CONTINUE
      CALL RDTAPE(12,BCDDAT,104,BINDAT,ISTAT)
      IF (ISTAT .EQ. 0) GO TO 65
      IF (ISTAT .NE. 1) GO TO 64
600   CONTINUE
      IF (INPUT .EQ. 1) GO TO 210
      IF (IDATER. NE. 99) GO TO 601
      IDATER = NULL
      ITAPE = 9
      GO TO 105
601   CONTINUE
      WRITE(NOUT,61)ISF
61    FORMAT(1H0,4X,19HCANNOT LOCATE SHIFT,2X,I1,2X,
      15HANALYSIS HALTED)
      WRITE(NOUT,62)
62    FORMAT(1H,4X,47HGO TO LOG PROCEDURES OR RESTART WITH
      VALID TAPE)
      GO TO 900
64    CONTINUE
      IF (ISTAT .NE. -1) GO TO 72
640   CONTINUE
      WRITE(NOUT,641)
641   FORMAT(1H0,4X,29HTAPE UNIT OFF,RESTART PROGRAM)
      IF (ITAPE .EQ. 2) GO TO 216
      GO TO 900
65    CONTINUE
      I = BCDDAT(10)
      IF (I .EQ. 1) GO TO 66
      IF (I .EQ. 2) GO TO 66
      IF (I .EQ. 3) GO TO 66
      GO TO 70
66    CONTINUE
      J = 8 * I-7
      DO 67 K = 5,12
      ISBUF(J) = BCDDAT(K)
      J = J + 1
67    CONTINUE
70    CONTINUE
      IF (IDATER .EQ. 99) GO TO 100
72    CONTINUE
      IF (IDATER .EQ. 1) GO TO 83
73    CONTINUE
      CALL RDTAPE(10,BCDDAT,105,BINDAT,ISTAT)
      IF (ISTAT .EQ. 1) GO TO 60
80    CONTINUE
      IF (ISTAT .EQ. 0) GO TO 83
      JSKIP = JSKIP +1
      IF (JSKIP .LE. 20) GO TO 70
      WRITE(NOUT,81)
81    FORMAT(1H0,22HMANY TAPE ERRORS. HALT)
      WRITE(NOUT,82) (BCDDAT(I),I = 1,6)
82    FORMAT (1H,9HHALT TIME,3(2X,2I1))
      GO TO 900
83    CONTINUE
      JSKIP = NULL
      IDATER = NULL
      IHRS = BCDDAT(1) * 10 + BCDDAT(2)
      IF (IHRPRE .EQ. 100) GO TO 84
      IF (IHRPRE .EQ. 23) GO TO 84
      IF (IHRS .LT. IHRPRE) GO TO 73
      IF (IHRS .GT. (IHRPRE + 8)) GO TO 73
84    IHRPRE = IHRS
      I = ISF
      IF (IHRS .GE. ISTMEL(I) .AND. IHRS .LT. ISTMEU(I))
      GO TO 85
      GO TO 72
85    CONTINUE
      IDATER = 0
      J = ISF * 8-7
      ISHIFT = ISBUF(J + 5)
90    CONTINUE
      MACHID = 1
      IF (ISBUF(J) .NE. 2) GO TO 95
      MACHID = 2
95    CONTINUE
      IYEARX = INPTY
100   CONTINUE
      CALL SFTANL
105   CONTINUE
      IF (IDATER .GT. 1) GO TO 120
      J = ISF * 8-7
      IDAYX(1) = ISBUF(J + 3)
      IDAYX(2) = ISBUF(J + 4)
      MONTHX(1) = ISBUF(J + 1)
      MONTHX(2) = ISBUF(J + 2)
      NOPER = ISBUF(J + 6)
      NOILER = ISBUF(J + 7)
      CALL MOVDAT
      IF (INPT .EQ. 1) GO TO 107
      IF (ITAPE .EQ. 9) GO TO 52
```

-continued

EXCANL SUBROUTINE LISTING

```
      GO TO 51
107   CONTINUE
      IF (IDCNT .EQ. 3) GO TO 108
      IF (IDCNT .NE. 1) GO TO 800
      IDCNT = 2
      ISF = 2
      GO TO 72
108   CONTINUE
      IDCNT = 1
      ISF = 1
      GO TO 72
120   CONTINUE
      IF (IDATER .NE. 20) GO TO 122
121   CONTINUE
      IDATER = 99
      GO TO 60
122   CONTINUE
      IF (IDATER .NE. 30) GO TO 125
      IDATER = 99
      GO TO 600
125   CONTINUE
      IF (IDATER .EQ. 8) GO TO 640
      IF (IDATER .EQ. 10) GO TO 600
      WRITE(NOUT,128)IDATER
128   FORMAT(1HO,4X,29HUNKNOWN SHIFT ERRORS, RESTART,2X,
      8HIDATER =,I4)
      GO TO 900
200   CONTINUE
      ITAPE = 1
      ISF = 3
      GO TO 60
210   CONTINUE
      IF (IDCNT .NE. 3) GO TO 214
      IF (IDATER .EQ. 99) GO TO 214
212   CONTINUE
      WRITE(NOUT,213)ISF
213   FORMAT(1HO,4X,5HSHIFT,2X,I1,2X,17HNOT ON TAPE. HALT)
      GO TO 900
214   CONTINUE
      IF (ITAPE .EQ. 2) GO TO 212
216   CONTINUE
      WRITE(NOUT,217)
217   FORMAT(1HO,4X,29HPLACE TAPE 2 ON, TYPE 9 READY)
      READ(NIN,218)INPTP
218   FORMAT(I1)
      IF (INPTP .NE. 9) GO TO 216
220   CONTINUE
      ITAPE = 2
      IDATER = 99
      GO TO 60
800   CONTINUE
      WRITE(NOUT,801)
801   FORMAT(1HO,4X,42HEND OF 3 SHIFTS ANALYSIS. LOAD LOG
      PROGRAM, 118HAND START FOR LOGS)
      GO TO 900
900   CONTINUE
      STOP
      END
```

MOVDAT SUBROUTINE LISTING

```
      COMMON ISHFTB(156),SHFTBL(171)
      DIMENSION IDMTBL(17),DMTBL1(12),DMTBL2(4),DMTBL3(4),
      DMTBL4(4)
      IDMTBL5(9)
      EQUIVALENCE (IDMTBL(1),MACHID)
      EQUIVALENCE (DMTBL1(1),DCTIME(1))
      EQUIVALENCE (DMTBL2(1),DIGGPC)
      EQUIVALENCE (DMTBL3(1),PRDNON)
      EQUIVALENCE (DMTBL4(1),RMSHOS)
      EQUIVALENCE (DMTBL5(1),AVDRGA)
64    CONTINUE
      I = ISHIFT
      J = 52 * (I-1) + 1
      DO 65 K = 1,17
      ISHFTB(J) = IDMTBL(K)
      J = J + 1
65    CONTINUE
      ISHFTB(J) = NDIGCY
      J = J + 1
      DO 66 K = 1,10
      ISHFTB(J) = ISCODE(K)
      ISHFTB(J + 10) = IDCODE(K)
      J = J + 1
66    CONTINUE
      J = J + 10
      ISHFTB(J) = IW
      J = J + 1
      ISHFTB(J) = NOSTEP
```

-continued

MOVDAT SUBROUTINE LISTING

```
      J = J + 1
      ISHFTB(J) = ISTTIM
      J = J+ 1
      DO 67 K = 1,8
      ISHFTB(J) = NOSWG(K)
      J = J + 1
67    CONTINUE
      ISHFTB(J) = IAVSWT
      J = J + 1
      ISHFTB(J) = IAVBKT
      J = J + 1
      ISHFTB(J) = NOMDRG
70    CONTINUE
      J = 57 * (I-1) + 1
      SHFTBL(J) = PRODTM
      J = J + 1
      SHFTBL(J) = PRODPC
      J = J + 1
      SHFTBL(J)= DIGGTM
      J = J + 1
      DO 72 K = 1,10
      SHFTBLE(J) = SCTIME(K)
      J = J + 1
72    CONTINUE
      DO 74 K = 1,12
      SHFTBL(J) = DMTBL1(K)
      J = J + 1
74    CONTINUE
      DO 76 K = 1,4
      SHFTBL(J) = DMTBL2(K)
      J = J + 1
76    CONTINUE
      DO 78 K = 1,4
      SHFTBL(J) = DMTBL3(K)
      J = J + 1
78    CONTINUE
      DO 80 K = 1,8
      SHFTBL(J) = PCSWG(K)
      J = J + 1
80    CONTINUE
      DO 82 K = 1,4
      SHFTBL(J) = DMTBL4(K)
      J = J + 1
82    CONTINUE
      SHFTBL(J) = PCBCKT
      J = J + 1
      DO 84 K = 1,9
      SHFTBL(J) = DMTBL5(K)
      J = J + 1
84    CONTINUE
      SHFTBL(J) = BENTIM
      J = J + 1
90    CONTINUE
      RETURN
      END
```

After the data recorded on the tape has been analyzed, all of the parameters necessary to prepare the shift and daily reports are stored in the ISHFTB and SHFTBL sections of the computer memory. The EXCLOG, or executive log program, calls the ENDCAL program subroutine which calculates certain end of shift parameters and then calls the DSLOG program subroutine which prints the shift report in the desired format. After the EXCLOG program prints a report for each shift it calls the DAYANL program subroutine which calculates certain end of day parameters. The DAYANL program subroutine in turn calls the DAYCDS program subroutine which accumulates the total time for each type of delay or special activity code. After the daily summary information has been calculated, the EXCLOG program calls the DSLOG program subroutine which prints the daily report.

EXCLOG SUBROUTINE LISTING

```
      COMMON ISHFTB(156),SHFTBL(171)
      DIMENSION IDMTBLE(17), DMTBL1(12),DMTBL2(4),DMTBL3(4),
      1DMTBL4(4),DMTBL5(9)
      EQUIVALENCE (IDMTBL(1),MACHID)
      EQUIVALENCE (DMTBL1(1),DCTIME(1))
      EQUIVALENCE (DMTBL2(1),DIGGPC)
      EQUIVALENCE (DMTBL3(1),PRDNON)
      EQUIVALENCE (DMTBL4(1),RMSHOS)
      EQUIVALENCE (DMTBL5(1),AVDRGA)
      DATA N,NIN,NOUT,NPNCH,NREAD/2,2,2,4,1/
10    CONTINUE
      WRITE(NOUT,11)
11    FORMAT(1HO,4X,38HINPUT 1 FOR NORMAL LOG, 2 FOR ABNORMAL)
      READ(NIN,12)INLOG
12    FORMAT(I1)
40    I = 1
42    CONTINUE
      J = 52 * (I-1) + 1
      DO 43 K = 1,17
```

-continued

EXCLOG SUBROUTINE LISTING

```
      L = J + K-1
      IDMTBL(K) = ISHFTB(L)
43    CONTINUE
      L = J + 17
      NDIGCY = ISHFTB(L)
      L = L + 1
      DO 44 K = 1,10
      ISCODE(K) = ISHFTB(L)
      IDCODE(K) = ISFHTB(L+ 10)
      L = I + 1
44    CONTINUE
      L = L + 10
      IW = ISHFTB(L)
      L = L + 1
      NOSTEP = ISHFTB(L)
      L = L + 1
      ISTTIM = ISHFTB(L)
      L = L + 1
      DO 45 K = 1,8
      NOSWG(K) = ISHFTB(L)
      L = L + 1
45    CONTINUE
      IAVSWT = ISHFTB(L)
      IAVBKT = ISHFTB (L + 1)
      NOMDRG = ISHFTB(L + 2)
50    CONTINUE
      J = 57 * (I-1) + 1
      K = 1
      L = J + K-1
      PRODTM = SHFTBL(L)
      PRODPC = SHFTBL(L + 1)
      DIGGTM = SHFTBL(L + 2)
      L = L + 3
      DO 52 K = 1,10
      SCTIME(K) = SHFTBL(L)
      L = L + 1
52    CONTINUE
      DO 53 K = 1,12
      DMTBL1(K) = SHFTBL(L)
      L = L + 1
53    CONTINUE
      DO 54 K = 1,4
      DMTBL2(K) = SHFTBL(L)
      L = L + 1
54    CONTINUE
      DO 55 K = 1,4
      DMTBL3(K) = SHFTBL(L)
      L = L + 1
55    CONTINUE
      DO 56 K = 1,8
      PCSWG(K) = SHFTBL(L)
      L = L + 1
56    CONTINUE
      DO 57 K = 1,4
      DMTBL4(K) = SHFTBL(L)
      L = L + 1
57    CONTINUE
      PCBCKT = SHFTBL(L)
      L = L + 1
      DO 58 K = 1,9
      DMTBL5(K) = SHFTBL(L)
      L = L + 1
58    CONTINUE
      BENTIM = SHFTBL(L)
      REHTIM = SHFTBL(L + 1)
60    CONTINUE
      IF (MACHID .NE. 0) GO TO 64
      IF (ISHIT .NE. 0) GO TO 64
      IF (INLOG .EQ. 2) GO TO 66
      WRITE(N,62)I
62    FORMAT(1H1,4X,5HSHIFT,2X,I1,2X,18HDATA NOT AVAILABLE)
      WRITE(N,63)
63    FORMAT(1H,4X,44HLOG IS NOT PRINTED AND DATA NOT IN
      DAILY LOG)
      GO TO 66
64    CONTINUE
      NSTP = 0
      CAL ENDCAL
      ISPEFL = 0
      CALL DSLOG
66    CONTINUE
      I = I + 1
      IF (I .LE. 3) GO TO 42
      IF (INLOG .NE. 1) GO TO 114
      CALL DAYANL
      NSTP = 2
      CALL ENDCAL
      ISPEFL = 0
      CALL DSLOG
114   CONTINUE
      WRITE(N,512)
512   FORMAT(1H1,4X,23HEND OF STANDARD REPORTS)
```

-continued

EXCLOG SUBROUTINE LISTING

```
      WRITE(NOUT,513)
513   FORMAT(1H0)
      STOP
      End
```

ENDCAL SUBROUTINE LISTING

```
      COMMON ISHFTB(156),SHFTBL(171)
      COMMON NDIGS,NDIGM,AVCYTS,AVCYTM,DIGTS,DIGTM
      DATA ONEHND/100./
      DATA FNULL,NULL/0.0,0/
5     CONTINUE
      IF (ISHIFT .NE. 1) GO TO 7
      FXTBLE(2) = FNULL
      FXTBLE(3) = FNULL
7     CONTINUE
10    IF (NSTP .NE. 2) GO TO 12
      TOTTIM = 24.0
      GO TO 14
12    TOTTIM = 8.0
14    CONTINUE
      PRODPC = (PRODTM/TOTTIM) * ONEHND
      DWNTM = FNULL
      DO 15 I = 1,10
      IF(IDCODE(I) (IDCODE(I) .EQ. NULL) GO TO 20
      DWNTM = DWNTM + DCTIME(I)
15    CONTINUE
20    DIGGTM = TOTTIM = DWNTM
      DIGGPC = (DIGGTM/TOTTIM) * ONEHND
43    CONTINUE
      DWNPC = (DWNTM/TOTTIM) * ONEHND
      PSTOT = FNULL
      DO 45 I = 1,8
      POSWG - NOSWG(I)
      PSTOT - PSTOT + POSWG
45    CONTINUE
      DO 49 I = 1,8
      IF(NOSWG(I) .NE. 0) GO TO 48
      PCSWG(I) = FNULL
      GO TO 49
48    PNOSWG = NOSWG(I)
      PCSWG(I) = (PNOSWG/PSTOT) * ONEHND
49    CONTINUE
      IF (NSTP .GE. 2) GO TO 50
492   PAVSWT = IAVSWT
      FNDIGC = NDIGCY
      PAVSWT = (PAVSWT/FNDIGC) + 0.5
      IAVSWT = PAVSWT
      PAVBKT = IAVBKT
      PAVBKT = (PAVBKT/FNDICG) + 0.5
      IAVBKT = PAVBKT
      FXTBLE(2) = FXTBLE(2) + PAVSWT * FNDIGC
      FXTBLE(3) = FXTBLE(3) + PAVBKT * FNDIGC
      GO TO 90
50    CONTINUE
      FNDIGC - NDIGCY
      PAVSWT - FXTBLE(2)/FNDIGC + 0.5
      PAVBKT = FXTBLE(3)/FNDIGC + 0.5
      IAVSWT = PAVSWT
      IAVBKT = PAVBKT
90    CONTINUE
      RETURN
      END
```

DAYANL SUBROUTINE LISTING

```
      COMMON ISHFTB(156),SHFTBL(171)
      DIMENSION FTCYS(3),DMTBL(5)
      EQUIVALENCE (DMTBL(1),AVDRGA)
      DATA NULL,FNULL/0,0.0/
10    CONTINUE
      PRODTM = SHFTBL(1) + SHFTBL(58) + SHFTBL(115)
12    CONTINUE
      ISPEFI = 1
      CALL DAYCDS
14    ISPEFL = 2
      CALL DAYCDS
16    CONTINUE
      WALKTM = SHFTBL(29) + SHFTBL(86) + SHFTBL(143)
      NDIGCY = ISHFTB(18) + ISHFTB(70) + ISHFTB(122)
18    CONTINUE
      FNDIGC = NDIGCY
20    CONTINUE
      IW = NULL
      DO 22 I = 39,143,52
      IW + IW + ISHFTB(I)
```

-continued

DAYANL SUBROUTINE LISTING

```
22   CONTINUE
     NOSTEP = NULL
     DO 23 I = 40,144,52
     NOSTEP = NOSTEP + ISHFTB(I)
23   CONTINUE
24   CONTINUE
     IAVSWT = NULL
     IAVBKT = NULL
     DO 25 I = 50,154,52
     IAVSWT = IAVSWT + (ISHFTB(I) * ISHFTB(I-32))/10
     IAVBKT = IAVBKT + (ISHFTB (I + 1) * ISHFTB(I-32))/10
25   CONTINUE
28   CONTINUE
     DO 29 I = 1,8
     NOSWG(I) = NULL
29   CONTINUE
     DO 30 J = 42,146,52
     DO 291 K = 1,8
     L = J + K-1
     NOSWG(K) = ISHFTB(L) + NOSWG(K)
291  CONTINUE
30   CONTINUE
31   CONTINUE
32   FTCYS(1) = ISHFTB(18)
     FTCYS(2) = ISHFTB(70)
     FTCYS(3) = ISHFTB(122)
     AVCYT = FNULL
     AVANGL = FNULL
     J = 1
     DO 34 I = 24,138,57
     AVCYT = AVCYT + SHFTBL(I) * FTCYS(J)
     AVANGL = AVANGL + SHFTBL(I + 9) * FTCYS(J)
     J = J + 1
34   CONTINUE
     AVCYT = AVCYT/FNDIGC
     AVANGL = AVANGL/FNDIGC
     PCBUCK = FNULL
     J = 1
     DO 36 I = 45,159,57
     PCBUCK = PCBUCK + SHFTBL(I) * FTCYS(J)
     J = J + 1
36   CONTINUE
     PCBUCK = PCBUCK/FNDIGC
40   CONTINUE
     NOMDRG = NULL
     DO 41 I = 52,156,52
     NOMDRG = ISHFTB(I) + NOMDRG
41   CONTINUE
     DO 43 I = 1,5
     DMTBL(I) = FNULL
43   CONTINUE
     D 45 I = 1,5
     K = 1
     DO 44 J = 47,161,57
     L = J - 1 + I
     DMTBL(I) = (DMTBL(I) + SHFTBL(L) * FTCYS (K))
     K = K + 1
44   CONTINUE
     DMTBL(I) = DMTBL(I)/FNDIGC
45   CONTINUE
     PEAKW = FNULL
     DMDMAX = FNULL
     DO 48 I = 52,116,57
     IF (SHFTBL(I) .LT. PEAKW) GO TO 47
     PEAKW = SHFTBL(I)
47   IF (SHFTBL(I + 2) .LT. DMDMAX) GO TO 48
     DMDMAX = SHFTBL(I + 2)
48   CONTINUE
50   CONTINUE
     RMSHOS = FNULL
     AVPEKW = FNULL
     J = 1
     DO 51 I = 42,156,57
     RMSHOS = (RMSHOS + SHFTBL(I) * FTCYS(J))
     AVPEKW = (AVPEKW + SHFTBL(I + 11) * FTCYS(J))
     J = J + 1
51   CONTINUE
     RMSHOS = RMSHOS/FNDIGC
     AVPEKW = AVPEKW/FNDIGC
52   CONTINUE
     AVEDMD = FNULL
     TOTKWH = FNULL
     DO 53 I = 43,157,57
     AVEDMD = AVEDMD + SHFTBL (I + 12)
     TOTKWH = TOTKWH + SHFTBL(I)
53   CONTINUE
     AVEDMD = AVEDMD/3.0
     GO TO 90
90   CONTINUE
     RETURN
     END
```

-continued

DAYCDS SUBROUTINE LISTING

```
      COMMON ISHFTB(156),SHFTBL(171)
      COMMON SPRS(25)
      COMMON DMOTBL(72),IDMOTB(84)
      DIMENSION ICODES(10),CDTIME(10)
      DO 5 I = 1,10
      ICODES(1) = 0
      CDTIME(I) = 0.
    5 CONTINUE
      IF(ISPEFL .EQ. 1) GO TO 10
      N = 29
      LN = 14
      GO TO 12
   10 CONTINUE
      N = 19
      LN = 4
   12 CONTINUE
      DO 30 I = 1,3
      K = 52 * (I - 1) + N
      M = 57 * (I - 1) + LN
   14 CONTINUE
      DO 26 J = 1,10
      KJ = K + J -1
      ICODE = ISHFTB(KJ)
      IF(ICODE .EQ. 0) GO TO 30
   16 CONTINUE
      DO 20 L = 1,10
```

DAYCDS SUBROUTINE LISTING

```
      IF(ICODES(L) .EQ. 0) GO TO 22
      IF(ICODES(L) .EQ. ICODE) GO TO 24
   20 CONTINUE
      GO TO 26
   22 CONTINUE
      ICODES(L) = ICODE
   24 MJ = M + J -1
      CDTIME(L) = SHFTBL(MJ) + CDTIME(L)
   26 CONTINUE
   30 CONTINUE
      IF(ISPEFL .NE. 1) GO TO 36
   32 DO 34 I = 1,10
      ISCODE(I) = ICODES(I)
      SCTIME(I) = CDTIME(I)
   34 CONTINUE
      GO TO 40
   36 DO 38 I = 1,10
      IDCODE(I) = ICODES(I)
      DCTIME(I) = CDTIME(I)
   38 CONTINUE
   40 ISPEFL = 0
   90 CONTINUE
      RETURN
      END
```

DSLOG SUBROUTINE LISTING

```
COMMON ISHFTB(156),SHFTBL(171)
DIMENSION DCALPH(3,67)
DIMENSION ALPHM(4)
DIMENSION IDG(8)
DATA N/2/
DATA IDG(1),IDG(2),IDG(3),IDG(4),IDG(6),IDG(6),IDG(7),
IDG(8)
1/0,30,60,80,100,120,150,180/
DATA ALPHM(1),ALPHM(2),ALPHM(3),ALPHM(4)
1/4H 25,4H70W ,4H 82,4H00 /
DATA DCALPH(1 ,1),DCALPH(2), 1),DCALPH(3, 1)
1/4HUTIL,4H.PWR,4H OFF/
DATA DCALPH(1, 2),DCALPH(2, 2),DCALPH(3, 2)
1/4HACC1,4HDENT,4H /
DATA DCALPH(1, 3),DCALPH(2, 3),DCALPH(3, 3)
1/4HFUNE,4HRAL ,4H /
DATA DCALPH(1, 4),DCALPH(2, 4),DCALPH(3, 4)
1/4HACT ,4HOF ,4HNAT /
DATA DCALPH(1, 5),DCALPH(2, 5),DCALPH(3, 5)
1/4HLEVE,4HLING,4HM/C /
DATA DCALPH(1, 6),DCALPH(2, 6),DCALPH(3, 6)
1/4HWAIT,4H LOA,4HDER /
DATA DCALPH(1, 7),DCALPH(2, 7),DCALPH(3, 7)
1/4HDRIL,4HL/SH,4HOOT /
DATA DCALPH(1, 8),DCALPH(2, 8),DCALPH(3, 8)
1/4WAIT,4H - D,4HOZER/
DATA DCALPH(1, 9),DCALPH(2, 9),DCALPH(3, 9)
1/4HCLEA,4HNING,4H M/C/
DATA DCALPH(1,10),DCALPH(2,10),DCALPH(3,10)
1/4H OIL,4H/GRE,4HASE /
DATA DCALPH(1,11),DCALPH(2,11),DCALPH(3,11)
1/4HCABL,4HE CH,4HANGE/
DATA DCALPH(1,12),DCALPH(2,12),DCALPH(3,12)
1/4HSUPP,4HLIES,4H /
DATA DCALPH(1,13),DCALPH(2,13),DCALPH(3,13)
1/4HNO S,4HPOIL,4H RM /
DATA DCALPH(1,14),DCALPH(2,14),DCALPH(3,14)
1/4HCABLE,4HE DA,4HMAGE/
DATa DCALPH(1,15),DCALPH(2,15),DCALPH(3,15)
1/4H LUN,4HCH ,4H /
DATA DCALPH(1,16),DCALPH(2,16),DCALPH(3,16)
1/4HMISC,4H. OP,4HER /
DATA DCALPH(1,17),DCALPH(2,17),DCALPH(3,17)
1/4HVAC/,4HHOLI,4HDAY /
DATA DCALPH(1,18),DCALPH(2,18),DCALPH(3,18)
1/4H ,4H ,4H /
DATA DCALPH(1,19),DCALPH(2,19),DCALPH(3,19)
1/4H ,4H ,4H /
DATA DCALPH(1,20),DCALPH(2,20),DCALPH(3,20)
1/4H ,4H ,4H /
DATA DCALPH(1,21),DCALPH(2,21),DCALPH(3,21)
1/4HDEAD,4HHEAD,4HING /
DATA DCALPH(1,22),DCALPH(2,22),DCALPH(3,22)
1/4HSLID,4HES ,4H /
DATA DCALPH(1,23),DCALPH(2,23),DCALPH(3,23)
1/4HROAD,4ES/IN,4HCLS /
DATA DCALPH(1,24),DCALPH(2,24),DCALPH(3,24)
1/4HMOVE,4H SPO,4HIL /
DATA DCALPH(1,25),DCALPH(2,25),DCALPH(3,25)
1/4HDIG/,4HIN-0,4HUT /
DATA DCALPH(1,26),DCALPH(2,26),DCALPH(3,26)
1/4HLEVE,4HL SP,4HOIL /
```

-continued

DSLOG SUBROUTINE LISTING

```
DATA DCALPH(1,27),DCALPH(2,26),DCALPH(3,27)
1/4H ,4H ,4H /
DATA DCALPH(1,28),DCALPH(2,28),DCALPH(3,28)
1/4H ,4H ,4H /
DATA DCALPH(1,29),DCALPH(2,29),DCALPH(3,29)
1/4H ,4H ,4H /
DATA DCALPH(1,30),DCALPH(2,30),DCALPH(3,30)
1/4H ,4H, 4H /
DATA DCALPH(1,31),DCALPH(2,31),DCALPH(3,31)
1/4HBUCK,4HET ,4H /
DATA DCALPH(1,32),DCALPH(2,32),DCALPH(3,32)
1/4HROPE,4HS ,4H /
DATA DCALPH(1,33),DCALH(2,33),DCALPH(3,33)
1/4HBOOM,4H ,4H /
DATA DCALPH(1,34),DCALPH(2,34),DCALPH(3,34)
1/4HSTIC,4HKS/T,4HUB /
DATA DCALPH(1,35),DCALPH(2,35),DCALPH(3,35)
1/4HPROP,4HEL M,4HACH./
DATA DCALPH(1,36),DCALPH(2,36),DCALPH(3,36)
1/4HDRAG,4H MA,4HCH. /
DATA DCALPH(1,37),DCALPH(2,37),DCALPH(3,37)
1/4HHOIS,4HT MA,4HCH. /
DATA DCALPH(1,38),DCALPH(2,38),DCALPH(3,38)
1/4HSWIN,4HG MA,4HCH. /
DATA DCALPH(1,39),DCALPH(2,39),DCALPH(3,39)
1/4HREG.,4HMAIN,4HT-ME/
DATA DCALPH(1,40),DCALPH(2,40),DCALPH(3,40)
1/4HMISC,4H. ME,4HCH. /
DATA DCALPH(1,41),DCALPH(2,41),DCALPH(3,41)
1/4HMULT,4H. DE,4HLAY /
DATA DCALPH(1,42),DCALPH(2,42),DCALPH(3,42)
1/4HUNID,4HENT ,4HDELY/
DATA DCALPH(1,43),DCALPH(2,43),DCALPH(3,43)
1/4H ,4H ,4H /
DATA DCALPH(1,44),DCALPH(2,44),DCALPH(3,44)
1/4H ,4H ,4H /
DATA DCALPH(1,45),DCALPH(2,45),DCALPH(3,45)
1/4H ,4H ,4H /
DATA DCALPH(1,46),DCALPH(2,46),DCALPH(3,46)
1/4HCABL,4HE DE,4HFECT/
DATA DCALPH(1,47),DCALPH(2,47),DCALPH(,347)
1/4HCLTR,4H. RI,4HNG /
DATA DCALPH(1,48),DCALPH(2,48),DCALPH(3,48)
1/4HHV C,4HONT/,4HSWCH/
DATA DCALPH(1,49),DCALPH(2,49),DCALPH(3,49)
1/4HLV C,4HONT/,4HSWCH/
DATA DCALPH(1,50),DCALPH(,250),DCALPH(3,50)
1/4HDC C,4HONTR,4HOL /
DATA DCALPH(1,51),DCALPH(2,51),DCALPH(3,51)
1/4HMG ,4HSETS,4H /
DATA DCALPH(1,52),DCALPH(2,52),DCALPH(3,52)
1/4HDRAG,4H MO,4HTORS/
DATA DCALPH(1,53),DCALPH(2,53),DCALPH(3,53)
1/4HHOIS,4HT MO,4HTORS/
DATA DCALPH(1,54),DCALPH(2,54),DCALPH(3,54)
1/4HSWIN,4HG MO,4HTORS/
DATA DCALPH(1,55),DCALPH(2,55),DCALPH(3,55)
1/4HREG.,4HMAIN,4HT-EL/
DATA DCALPH(1,56),DCALPH(2,56),DCALPH(3,56)
1/4HMISC,4H.EIE,4HCT./
DATA DCALPH(1,57),DCALPH(2,57),DCALPH(3,57)
1/4H ,4H ,4H /
DATA DCALPH(1,58),DCALPH(2,58),DCALPH(3,58)
1/4H ,4H ,4H /
DATA DCALPH(1,59),DCALPH(2,59),DCALPH(3,59)
1/4H ,4H ,4H /
DATA DCALPH(1,60),DCALPH(2,60),DCALPH(3,60)
1/4H ,4H ,4H /
DATA DCALPH(1,61),DCALPH(2,61),DCALPH(,361)
1/4H ,4H ,4H /
DATA DCALPH(1,62),DCALPH(2,62),DCALPH(3,62)
1/4HOILE,4HR OP,4HER /
DATA DCALPH(1,63),DCALPH(2,63),DCALPH(3,63)
1/4HBENC,4HHING,4H /
DATA DCALPH(1,64),DCALPH(2,64),DCALPH(3,64)
1/4HRE-H,4HANDL,4HING /
DATA DCALPH(1,65),DCALPH(2,65),DCALPH(3,65)
1/4H ,4H ,4H /
DATA DCALPH(1,66),DCALPH(2,66),DCALPH(3,66)
1/4H TE,4HST ,4H /
DATA DCALPH(1,67),DCALPH(2,67),DCALPH(3,67)
1/4H ,4H ,4H /
WRITE(N,200)
IF (NSTP .EQ. 3) GO TO 5
WRITE(N,203)
GO TO 6
WRITE(N,2031)
WRITE(N,204)
WRITE(N,201)
MID = 2 * MACHID-1
IF (NSTP .NE. 3) GO TO 8
IF (MID .EQ. 1 .OR. MID .EQ. 2) GO TO 7
```

-continued

DSLOG SUBROUTINE LISTING

```
      MID = 1
7     WRITE(N,2074)ALPHM(MID),ALPHM(MID+1),MONTHX(1),MONTHX(2),
      IDAYX(1),
      1IDAXY(2)
      GO TO 21
8     IF (MACHID-1) 11,20,9
9     IF (MACHID-2) 11,20,11
20    WRITE(N,2071)ALPHM(MID),ALPHM(MID+1),MONTHX(1),MONTHX(2),
      IDAXY(1),
      1IDAYX(2),IYEARY
      GO TO 21
11    WRITE(N,2073)MONTHX(1),MONTHX(2),IDAXY(1),IDAXY(2),IYEARX
21    IF (NSTP.EQ.2) GO TO 30
22    IF(NSTP .EQ. 3) GO TO 32
      WRITE(N,209)ISHIFT,NOPER,NOILER
      GO TO 40
30    WRITE(N,201)
      GO TO 45
32    WRITE(N,2091)ISHIFT,NOPER
      GO TO 45
40    IHRS = IBTIMH(1) * 10 + IBTIMH(2)
      MIN = IBTIMM(1) * 10 + IBTIMM(2)
      MINBEG = IHRS * 60 + MIN
      IHRS = IETIMH(1) * 10 + IETIMH(2)
      MIN = IETIMM(1) * 10 + IETIMM(2)
      MINEND = IHRS * 60 + MIN
      IF (MINEND.GT.MINBEG) GO TO 23
      MINEND = MINEND + 1440
23    MINTOT = MINEND-MINBEG
      TOTMIN = MINTOT
      STIME = TOTMIN /60.0
      WRITE(N,210)IBTIMH(1),IBTIMH(2),IETIMH(1),IETIMH(2),STIME
45    WRITE(N,202)
100   IF (NSTP.EQ.2) GO TO 120
      IF (NSTP .EQ. 3) GO TO 121
      WRITE(N,2131)
      GO TO 110
120   WRITE(N,2132)
      GO TO 110
121   WRITE(N,2133)
110   WRITE(N,214)PRODTM,PRODPC
      IF(NSTP .NE. 3) GO TO 1101
      WRITE(N,2151)NDIGCY
      GO TO 1102
1101  WRITE(N,215)NDIGCY
1102  WRITE(N,217)
      WRITE(N,218),DIGGTM,DIGGPC
      WRITE(N,220)DIGOIL
      WRITE(N,221)BENTIM
      WRITE(N,222)BEHTIM
      IF (NSTP .NE. 3) GO TO 111
      DAYS = ISHIFT
      STIME = DAYS * 24.0
      GO TO 125
111   IF (NSTP .NE. 2) GO TO 125
      STIME = 24.
125   PCTNON = (PRDNON/STIME) * 100.
      WRITE(N,223)PRDNON,PCTNOM
      WRITE(N,224)NOSTEP,WALKTM
      J = 1
130   IF (ISCOD(J).EQ.0) GO TO 140
133   IF (ISCOD(J).GT.76) GO TO 134
      IF (ISCOD(J).LE.9) GO TO 134
      IF (ISCODE(J) .EQ. 71) GO TO 135
      IF (ISCODE(J) .EQ. 72) GO TO 135
      IF (ISCODE(J) .EQ. 73) GO TO 135
      ICODE = (ISCODE(J)-9)
      WRITE(N,226)ISCODE(J),(DCALPH(I,ICODE),I = 1,3),SCTIME(J)
135   J = J + 1
      IF (J.GT.10) GO TO 140
      GO TO 130
134   WRITE(N,2261)ISCODE(J),SCTIME(J)
      GO TO 135
140   WRITE(N,227)PRDNOH
      WRITE(N,228)DWNTM,DWNPC
      J = 1
150   IF (IDCODE(J).EQ.0) GO TO 170
155   IF (IDCODE(J).Gt.76) GO TO 160
      IF (IDCODE(J).LE.9) GO TO 160
      ICODE = (IDCOD(J)-9)
      WIRTE(N,226)IDCODE(J),(DCALPH(I,ICODE),I = 1,3),DCTIME(J)
165   J = J + 1
      IF (J.GT.10) GO TO 170
      GO TO 150
160   WRITE(N,2301)IDCODE(J),DCTIME(J)
      GO TO 165
170   WRITE(N,232)
180   CONTINUE
      WRITE(N,233)AVCYT,AVANGL
      WRITE(N,235)
      DO 181 I = 1,7
      WRITE(N,236)IDG(I),IDG(I + 1),NOSWG(I),PCSWG(I)
```

-continued

DSLOG SUBROUTINE LISTING

```
181   CONTINUE
      WRITE(N,243)NOSWG(8),PCSWG(8)
      WRITE(N,245)IAVSWT
      WRITE(N,246)IAVBKT
      WRITE(N,247)PCBUCK
      WRITE(N,249)AVDRGR
      WRITE(N,250)AVHOSR
      WRITE(N,248)NOMDRG
      WRITE(N,251)AVDRGA
      WRITE(N,252)RMSDRA
      WRITE(N,253)RMSHOS
      TOTKW1 = 100. * TOTKWH
      IAVWHC = AVKWHC
      IPEAKW = PEAKW
      IAVPWK = AVPEKW
      IMXDMD = DMDMAX
      IAVDMD = AVEDMD
190   WRITE(N,255)
      IF(NSTP.EQ.2) GO TO 194
      IF (NSTP .EQ. 3) GO TO 193
      WRITE(N,256)TOTKW1,IAVWHC
      GO TO 195
193   WRITE(N,2562)TOTKW1,IAVWHC
      GO TO 195
194   WRITE(N,2561)TOTKW1,IAVWHC
195   WRITE(N,257)IAVDMD,IAVPKW
      WRITE(N,258)IMXDMD,IPEAKW
      WRITE(N,201)
200   FORMAT(1H1)
201   FORMAT(1H0)
202   FORMAT(1H )
203   FORMAT (1HO,28X,15HDAILY ANALYSIS)
2031  FORMAT(1H0,27X,15HMONTH TO DATE)
204   FORMAT(1H ,27X,15HSTANDARD REPORT)
2071  FORMAT(1H ,4X,11HMIDWAY MINE,4X,2A4,8HDRAGLINE,5X,2I1,1H/
      ,2I1,1H/,
      1I4)
2073  FORMAT(1H ,4X,11HMIDWAY MINE,1X,23HINCORRECT INPUT MACH
      ID,1X,
      12I1,1H/,2I1,1H/,I4)
2074  FORMAT(1H ,4X,11HMIDWAY MINE,4X,2A4,8HDRAGLINE,5X,
      114HDAY LAST ENTRY,2X,2I1,1H/,2I1)
209   FORMAT(1H0,7X,6HSHIFT I1,3X,9HOPERATOR,I1,3X,6HOILER ,I1)
2091  FORMAT(1H0,7X,31HNUMBER OF DAYS DATA AVERAGED = ,I2,3X,
      120HPREVIOUS LAST DAY = ,I2)
210   FORMAT(1H ,6X,6HBEGIN ,2I1,3H00 ,6X,4HEND ,2I1,3H00 ,3X,
      17HTOTAL =,1X,F5.2,6H HOURS)
2131  FORMAT(1H ,4X,13HSHIFT SUMMARY)
2132  FORMAT(1H ,4X,13HDAILY SUMMARY)
2133  FORMAT(1H ,4X,21HMONTH TO DATE SUMMARY)
214   FORMAT(1H ,21X,F6.2,1X,21HHOURS OF PRODUCTION =,F5.1,1H%)
2151  FORMAT(1H ,21X,I4,1HO,15H DIGGING CYCLES)
215   FORMAT(1H ,21X,I5,15H DIGGING CYCLES)
217   FORMAT(1HO,4X,13HTIME ANALYSIS)
219   FORMAT(1H ,11X,21HAVAILABLE DIG TIME = ,F6.2,9H HOURS =
      ,2X,F5.1,
      11H%)
220   FORMAT(1H, 23X,13HOILER OPER = ,F6.2)
221   FORMAT(1H ,23X,7HBENCHES,4X,2H = ,F6.2)
222   FORMAT(1H ,23X,9HRE-HANDLE,2X,2H = ,F6.2)
223   FORMAT(1H ,15X,21HNON-PRODUCTIVE TIME =,F5.2,1X,7HHOURS
      =,F5.1,
      11H%)
224   FORMAT(1H ,22X,7HWALKING, I3,8H STEPS =,F5.2)
226   FORMAT(1H ,23X,I2,1X,3A4,1X,1H =,F5.2)
2261  FORMAT(1H ,23X,I2,1X,12HSPEC CODE NG,1X,1H =,F5.2)
227   FORMAT(1H ,24X,16HOTHER NON-PROD =,F5.2)
228   FORMAT(1H ,15X,8HDOWNTIME,11X,1H =,F6.2,1X,7HHOURS =,
      F5.1,1H%)
2301  FORMAT(1H ,23X,I2,1X,12HDELY CODE NG,1X,1H =,1X,F5.2)
232   FORMAT(1HO, 4X,16HDIGGING ANALYSIS)
233   FORMAT(1H ,8X,11HAVE CYCLE =,F4.0,7HSECONDS,5X,11HAVE
      SWING =,
      1I4, 1X,7HDEGREES)
235   FORMAT(1HO,16X,6HSWINGS,4X,6HNUMBER,3X,10H% OF TOTAL
236   FORMAT(1H ,13X,I3,3H - ,I3,4X,I4,8X,F4.1)
243   FORMAT(1H, 13X,9HGRTR- 180,5X,I3,8X,F4.1)
245   FORMAT(1HO,9X,16HAVE SWING TIME =,I3)
246   FORMAT(1H, 8X,16HAVE DRAG TIME =,I3)
247   FORMAT(1H ,8X,21HAVE EST BUCKET FILL =,F4.0,1H%)
249   FORMAT(1H ,8X,28HDRAG ROPE OUT TO START DIG =,1X,F4.0,
      1X,2HFT)
250   FORMAT(1H ,8X, 23HVERTICAL HOIST DISTANCE,4X,1H =,F5.0,
      1X,2HFT)
248   FORMAT(1H ,8X,25HCYCLES WITH MULT PASSES =,I3)
251   FORMAT(1H, 8X,13HAVE DRAG AMPS,2X,1H-,F6.0)
252   FORMAT(1H ,8X,13HRMS DRAG AMPS,2X,1H =,F6.0)
253   FORMAT(1H ,8X,16HRMS HOIST AMPS =,F6.0)
255   FORMAT(1HO,4X,14HPOWER ANALYSIS)
256   FORMAT(1H ,6X,17HTOTAL SHIFT KWH =,F6.0,15X,15HAVE
      KWH/CYCLE =,
      1I4)
```

-continued

DSLOG SUBROUTINE LISTING

```
2561 FORMAT(1H ,6X,17HTOTAL DAILY KWH =,F7.0,15X,15HAVE KWH/
     CYCLE =,
     I14)
2562 FORMAT(1H ,6X,18HTOTAL M.T.D. KWH =,F8.0,14X,13HAVE KWH/
     CYCLE,
     12H =,I4)
257  FORMAT(1H ,6X,19HAVE 15 MIN DEMAND =,I5,3H KW,12X,
     19HAVE KW PEAK/CYCLE =,I6)
258  FORMAT(1H, 6X,19HMAX 15 MIN DEMAND =,I5,3H KW,12X,
     15HLARGEST KW PEAK,3X,1H =,I6)
60   RETURN
     END
```

While the present invention has been described with reference to a specific embodiment thereof, it will be obvious to those skilled in the art that various changes and modifications may be made without departing from the invention and its broader aspects.

It is contemplated in the appended claims to cover all variations and modifications of the invention which come within the true spirit and scope of the invention.

What is claimed as new and desired to be secured by Leters Patent of the United States is:

1. A system for analyzing the performance of a power operated excavator having a lower frame member and a boom rotatable with respect to the lower frame member, a bucket controlled by means of a motor driven drag cable and a motor driven hoist cable, the system comprising:

a. drag sensor means for generating a signal representative of the drag cable length;

b. hoist sensor means for generating a signal representative of the hoist cable length;

c. swing angle sensor means for generating a signal representative of the angle of the boom relative to the lower frame member;

d. first shunt means in circuit with the drag motor for generating a signal proportional to the drag motor current;

e. second shunt means in circuit with the hoist motor for generating a signal proportional to the hoist motor current;

f. memory means for storing the sensor and shunt means signals;

g. a multi-switch control panel for generating codes identifying excavator delay or special excavator activities, the excavator, and its time period of operation, said memory means being operably connected to said control panel for storing the identifying codes;

h. a computer including computer means for accessing instructions that control the computer; to scan said memory means and compare the sensor and shunt signals and said codes stored therein with certain of said instructions to analyze the recorded data, to generate indicia of selected operating cycles performed by the excavator during said time period of operation, and to calculate certain end-of-time-period parameters; and i. means for transferring said analyzed data and parameters to a print-out that is readable by an operator to classify the activity of the excavator during said time period.

2. A system as recited in claim 1 additionally comprising watts transducer means responsive to the excavator input power for generating a signal proportional to the power consumed by the excavator and wherein the memory means additionally stores the watts transducer signal.

3. A system as recited in claim 1 wherein the memory means includes a clock for generating a time signal and wherein the memory means periodically samples and records the sensor, shunt, and time signals.

4. A system for analyzing the performance of a power operated walking dragline excavator having a lower frame member and an upper frame member rotatable about a center pindle with respect to the lower frame member, a boom supported on the upper frame member, a drag cable having one end connected to a bucket and the other end wound on a motor driven drag drum, a hoist cable having one end connected to the bucket and the other end wound on a motor driven hoist drum, and a walking mechanism driven by the drag drum motor, the system comprising:

a. first drag sensor means for generating a signal representative of the drag cable length;

b. first hoist sensor means for generating a signal representative of the hoist cable length;

c. second drag sensor means for generating a signal representative of the force in the drag cable;

d. second hoist sensor means for generating a signal representative of the force in the hoist cable;

e. a clock for generating a time signal;

f. data acquisition means for periodically sampling and recording the sensor and time signals;

g. a multi-switch control panel for generating codes identifying excavator delay or special excavator activities, the excavator, and its time period of operation, said memory means being operably conected to said control panel for storing the identifying codes;

h. a computer including computer means for accessing instructions that control the computer; to scan said memory means and compare the sensor and shunt signals and said codes stored therein with certain of said instructions to analyze the recorded data, to generate indicia of selected operating cycles performed by the excavator during said time period of operation, and to calculate certain end-of-time-period parameters; and i. means for transferring said analyzed data and parameters to a print-out that is readable by an operator to classify the activity of the excavator during said time period.

* * * * *